US012550903B2

(12) United States Patent
Chen et al.

(10) Patent No.: US 12,550,903 B2
(45) Date of Patent: Feb. 17, 2026

(54) VIRAL ACTIVE AND/OR ANTI-MICROBIAL INKS AND COATINGS

(71) Applicant: Graphene Composites Limited, Stockton-on-Tees (GB)

(72) Inventors: Sandy Winthrop Chen, Balcombe (GB); Stephen Devine, Hebburn (GB)

(73) Assignee: GRAPHENE COMPOSITES LIMITED, Stockton-on-Tees (GB)

( * ) Notice: Subject to any disclaimer, the term of this patent is extended or adjusted under 35 U.S.C. 154(b) by 1045 days.

(21) Appl. No.: 17/088,319

(22) Filed: Nov. 3, 2020

(65) Prior Publication Data

US 2021/0352914 A1 Nov. 18, 2021

Related U.S. Application Data

(63) Continuation of application No. PCT/GB2020/052613, filed on Oct. 16, 2020.

(30) Foreign Application Priority Data

May 14, 2020 (GB) ...................................... 2007146
Oct. 16, 2020 (GB) ...................................... 2016427

(51) Int. Cl.
*A01N 63/40* (2020.01)
*A01N 35/02* (2006.01)
*A01N 35/04* (2006.01)
*A01N 59/00* (2006.01)
*A01N 59/16* (2006.01)
*C08K 9/02* (2006.01)
*C09D 5/16* (2006.01)

(52) U.S. Cl.
CPC ............. *A01N 63/40* (2020.01); *A01N 35/02* (2013.01); *A01N 35/04* (2013.01); *A01N 59/00* (2013.01); *A01N 59/16* (2013.01); *C08K 9/02* (2013.01); *C09D 5/1687* (2013.01)

(58) Field of Classification Search
CPC ....................................................... C08K 9/02
See application file for complete search history.

(56) References Cited

U.S. PATENT DOCUMENTS

| | | | |
|---|---|---|---|
| 2013/0330833 A1 | 12/2013 | Ruiz et al. | |
| 2014/0199777 A2 | 7/2014 | Ruiz et al. | |
| 2017/0281824 A1 | 10/2017 | Ryan et al. | |
| 2018/0088113 A1* | 3/2018 | Boss | G01N 15/1456 |
| 2020/0308019 A1* | 10/2020 | Chason | C02F 1/505 |

FOREIGN PATENT DOCUMENTS

| | | |
|---|---|---|
| CN | 102160998 | 8/2011 |
| CN | 105170132 | 12/2015 |
| CN | 106084983 | 11/2016 |
| CN | 106084999 A | 11/2016 |
| CN | 106167653 | 11/2016 |
| CN | 106221377 | 12/2016 |
| CN | 106366764 A | 2/2017 |
| CN | 106391002 | 2/2017 |
| CN | 105017705 | 6/2017 |
| CN | 107815193 | 3/2018 |
| CN | 109023942 | 12/2018 |
| CN | 109467985 A | 3/2019 |
| CN | 107617750 | 7/2019 |
| CN | 110540775 A | 12/2019 |
| CN | 110862716 A | 3/2020 |
| CN | 110694116 | 7/2020 |
| CN | 109207984 | 10/2020 |
| CN | 109329304 | 4/2021 |
| EP | 3281695 | 2/2018 |
| EP | 4213895 | 7/2023 |
| KR | 20140094189 | 7/2014 |
| WO | 2021203094 | 7/2021 |
| WO | 2022056645 | 3/2022 |

OTHER PUBLICATIONS

CA3,097,636, "Examination Report", May 26, 2022, 4 pages.
CA3,097,636, "Examination Report", Oct. 19, 2021, 4 pages.
Du et al., "Hypericin-loaded Graphene Oxide Protects Ducks Against a Novel Duck Reovirus", Materials Science & Engineering C-Materials for Biological Applications, vol. 105, Aug. 4, 2019, 8 pages.
GB2007146.0, "Search Report", Nov. 1, 2021, 5 pages.
Wierzbicki et al., "Graphene Oxide in a Composite With Silver Nanoparticles Reduces the Fibroblast and Endothelial Cell Cytotoxicity of an Antibacterial Nanoplatform", Nanoscale Research Letters, vol. 14, No. 1, Available Online at: https://doi.org/10.1186/s11671-019-3166-9, Oct. 11, 2019, 11 pages.
Du et al., "Antiviral Activity of Graphene Oxide-silver Nanocomposites by Preventing Viral Entry and Activation of the Antiviral Innate Immune Response", ACS Applied Bio Materials, vol. 1, Oct. 30, 2018, pp. 1286-1293.
Hu et al., "Graphene-based Antibacterial Paper", ACS Nano, vol. 4, No. 7, Jul. 27, 2010, pp. 4317-4323.
Karim et al., "All Inkjet-Printed Graphene-Silver Composite Ink on Textiles for Highly Conductive Wearable Electronics Applications", Scientific Reports, vol. 9, May 29, 2019, 10 pages.
Kim et al., "Antibacterial Activity and Reusability of CNT-Ag and GO-Ag Nanocomposites", Applied Surface Science, vol. 283, Oct. 2013, pp. 227-233.
Kumari et al., "A Novel Synthesis of the Graphene Oxide-silver Nanocomposite for Unique Physiochemical Applications", ACS Omega, vol. 5, No. 10, Mar. 17, 2020, pp. 5041-5047.
Liu et al., "Antibacterial Activity of Graphite, Graphite Oxide, Graphene Oxide, and Reduced Graphene Oxide: Membrane and Oxidative Stress", ACS Nano, vol. 5, No. 9, Sep. 27, 2011, pp. 6971-6980.
Sivasankarapillai et al., "On Facing the SARS-CoV-2 (COVID-19) With Combination of Nanomaterials and Medicine: Possible Strategies and First Challenges", Nanomaterials, vol. 10, No. 5, Apr. 28, 2020, 23 pages.

(Continued)

Primary Examiner — Vickey Nerangis
(74) Attorney, Agent, or Firm — Kilpatrick Townsend & Stockton LLP

(57) ABSTRACT

An ink comprises (i) a carrier; (ii) graphene and/or graphene oxide particles dispersed in the carrier; and (iii) a viral active and/or anti-microbial component adhered to the graphene and/or graphene oxide particles.

18 Claims, 6 Drawing Sheets

(56) References Cited

OTHER PUBLICATIONS

Figure 1:
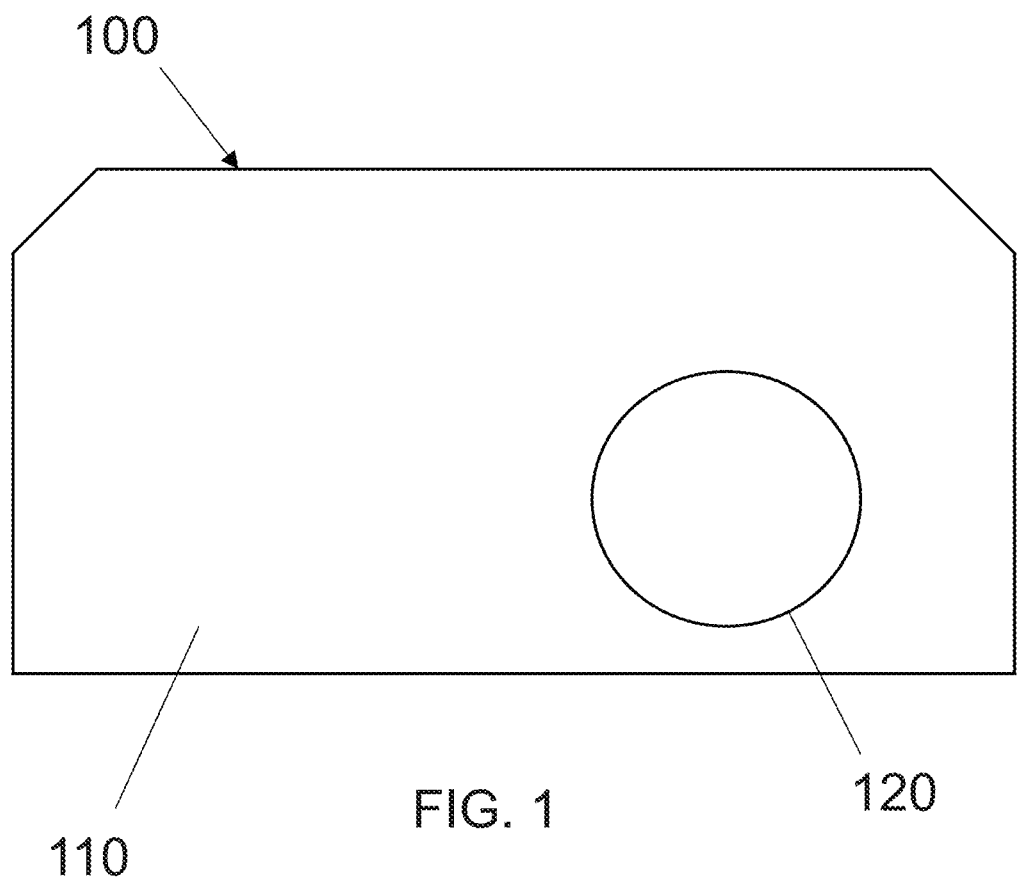

Sportelli et al., "Can Nanotechnology and Materials Science Help the Fight against SARS-CoV-2?", Nanomaterials, vol. 10, No. 4, Apr. 21, 2020, 12 pages.
Srivastava et al., "Can Graphene-based Materials Play a Role in the Fight against COVID-19?", Science Reporter, vol. 57, No. 5, May 2020, pp. 32-35.
Tai et al., "Facile Synthesis of Ag/GNS-g-PAA Nanohybrids for Antimicrobial Applications", Colloids and Surfaces B Biointerfaces, vol. 89, Sep. 6, 2011, pp. 147-151.
Vatanpour et al., "Fabrication and Characterization of Anti-fouling and Anti-bacterial Ag-loaded Graphene Oxide/polyethersulfone Mixed Matrix Membrane", Journal of Industrial and Engineering Chemistry, vol. 30, XP055416107, Oct. 1, 2015, pp. 342-352.
Vi et al., "The Preparation of Graphene Oxide-silver Nanocomposites: the Effect of Silver Loads on Gram-Positive and Gram-Negative Antibacterial Activities", Nanomaterials, vol. 8, No. 3, Mar. 14, 2018, 21 pages.
Yang et al., "Synergistic Antiviral Effect of Curcumin Functionalized Graphene Oxide Against Respiratory Syncytial Virus Infection", Nanoscale, vol. 9, No. 41, Jan. 1, 2017, pp. 16086-16092.
Ye et al., "The Effect of Sonication Treatment of Graphene Oxide on the Mechanical Properties of the Assembled Films", RSC Advances, vol. 6, 2016, pp. 39681-39687.
Zhong et al., "Reusable and Recyclable Graphene Masks with Outstanding Superhydrophobic and Photothermal Performances", ACS Nano, American Chemical Society, vol. 14, No. 5, May 26, 2020, pp. 6213-6221.
Chen et al. "Antiviral activity of graphene-silver nanocomposites against non-enveloped and enveloped viruses", Int. J. Environ. Res. Public Health, 13, 430, 2016.
Bryaskova et al., "Synthesis and comparative study on the antimicrobial activity of hybride materials based on silver nanoparticles (AgNPs) stablilzed by polyvinylpyrrolidone (PVP)", J.Chem.Biol., 4, pp. 185-191, Jul. 27, 2011 (Jul. 27, 2011).
Xiong et al. "Nanohybrids of silver nanoparticles grown in-situ on a graphene oxide silver ion salt: simple synthesis and their enhanced antibacterial activity", New Carbon Materials, 34(5), pp. 426-433, 2019 (Oct. 2019).
Shao et al., "Preparation, characterization and antibacterial activity of silver nanoparticle-decorated graphene oxide nanocomposite", App.Mat. & Interfaces, 7, pp. 6966-6973, Mar. 11, 2015 (Nov. 3, 2015).
Watson, "Decoration of graphene oxide with silver nanoparticles and controlling the silver nanoparticle loading on graphene oxide", University of Dayton 2014.
Gharibshahi, L., Saion, E., Gharibshahi, E., Shaari, A.H.&Matori, K.A. Influence of Poly(vinylpyrrolidone) concentration on properties of silver nanoparticles manufactured by modified thermal treatment method. PLoS One 12, 1-17 (2017).
Turkevich, J.; Stevenson, P.C.; Hiller, J.A study of the nucleation and growth process in the synthesis of colloidal gold. Discuss. Faraday Soc. 1951, 11, 55-75.
Urbaniak-Domagala, W. Electrical Properties of Polymers, Ch3, pp35-57, Nov. 5, 2018 DOI: 10.5772/intechopen.78612.
Yang et al, The Size and Concentration of Droplets Generated by Coughing in Human Subjects, Journal of Aerosol Medicine, vol. 20, No. 4, 2007.
Han et al, Glutathione-Capped Ag2S Nanoclusters Inhibit Coronavirus Proliferation through Blockage of Viral RNA Synthesis and Budding, ACS applied materials &interfaces 2018 10 (5), 4369-4378 DOI: 10. 1021/acsami.7b13811.
European Patent Application No. EP20793790.5, dated Aug. 7, 2025, 7 pp.

\* cited by examiner

VIRAL ACTIVE AND/OR ANTI-MICROBIAL INKS AND COATINGS

CROSS-REFERENCE TO RELATED APPLICATIONS

This application is a continuation of International Application No. PCT/GB2020/052613 filed Oct. 16, 2020, and claims priority and the benefit of United Kingdom Patent Application No. GB2007146.0 filed May 14, 2020, and United Kingdom Patent Application No. GB2016427.3 filed Oct. 16, 2020, the contents of each of which are hereby incorporated by reference into this application in their entirety.

FIELD OF INVENTION

The present invention relates to inks comprising a viral active and/or anti-microbial component, articles, methods of manufacture, and use of inks and articles comprising a viral active and/or anti-microbial component.

BACKGROUND TO THE INVENTION

There have been several major virus outbreaks amongst human populations over the past 20 years, including Ebola, SARS, MERS, Zika and most recently in 2019/2020 SARS-CoV-2, amongst others. There has been significant investment in research aimed combating these viruses, including preventing or reducing transmission to humans, preventing human-to-human transmission, developing vaccines and developing anti-virals and treatments for the diseases caused by these viruses.

Reducing human-to-human transmission is becoming increasingly more difficult as the world's population grows and there is increased movement of people. Even where this can be restricted, for example during the lockdowns imposed during the 2019/2020 SARS-CoV-2 pandemic, some human-to-human transmission is inevitable, either through human-human contact or through contact with the virus on surfaces. For example, healthcare workers will inevitably come into contact with those infected by the viruses and surfaces on which the virus is present. Similarly, workers in essential supply chains, such as food supply, will be unable to eliminate their exposure entirely. Therefore, it is necessary to provide protection to reduce transmission of the virus where isolation is not possible.

Existing protection typically comprises personal protective equipment (PPE), including facemasks for covering the mouth and nose, visors which cover the entire face of the user, gowns and/or gloves. The effectiveness of existing PPE does vary. For example, although certain masks can filter out a significant portion (e.g. 95% for "N95" masks) of harmful bacteria and viruses, few can actually kill viruses, and the coronaviruses in particular. The same is true of other PPE. For example, gloves prevent contact of viruses with the skin, but do not prevent the virus from being passed to other surfaces.

SUMMARY OF THE INVENTION

In a first aspect of the invention, there is provided an ink for providing a viral active and/or anti-microbial coating to a substrate, comprising (i) a carrier; (ii) graphene and/or graphene oxide particles dispersed in the carrier; and (iii) a viral active and/or anti-microbial component or additive adhered to the graphene and/or graphene oxide particles.

This combination of materials in the form of an ink provides a particularly effective viral active (virucidal active) and/or anti-microbial (germicidal) system that can easily be applied to surfaces or materials to provide highly effective treatment. For example, where viral active this can be anti-viral (in that it will inhibit the proliferation of the virus) and/or virucidal properties (i.e. it has the capacity to destroy or inactivate viruses) where they are needed. For anti-microbial, this can be anti-bacterial or germicidal component. For example, such an ink can easily be applied to PPE or other surfaces to provide these with anti-viral and/or virucidal properties and thereby reduce the risk of transmission of viruses and infection.

The high surface areas of graphene and graphene oxide enable them to be adhered or loaded with high levels of antiviral agents—making them ideal drug carriers. Moreover, the combination of graphene/GO and antiviral agents increases their antiviral performance as well as reducing the environmental toxicity of the antiviral agent—enabling significantly higher antiviral performance. Indeed, these compositions have been shown to be effective against a number of viruses, including coronaviruses. Embodiments provide a way of enabling these properties to be used practically, for example in manufacturing where the ink can be easily applied to materials and surfaces to provide them with anti-viral or virucidal/anti-microbial properties. While these materials can be produced in dried form, for example, the incorporation of these into a delivery mechanism that enables these materials to be applied to substrates (particularly in mass manufacturing) or that provides a stable and robust mechanism by which these materials can be distributed is more difficult. The inks of the present disclosure provide a solution to these problems. The inks provide a way of deposit these materials in a controlled manner so as to provide a functional, effective coating. The carrier can be chosen to provide a stable dispersion that can be applied to materials and evaporate in a controlled manner to provide a relatively uniform active coating. For example, this can be applied during manufacture of PPE (e.g. masks and/or gloves) or to surfaces by manufacturers further down the supply chain than would otherwise normally be required. This enables a wider proliferation and adoption of these materials and enables mass production of masks (e.g. particle protection masks), or other garments or equipment currently being used. This is particularly important where a quick response and increase in manufacture is required, for example as seen during the SARS-CoV-2 pandemic, where PPE shortages were commonplace. In some embodiments, the ink can be printed onto the surface of a material to form a layer of graphene and/or graphene oxide particles and a viral active and/or anti-microbial component.

Graphene oxide is particularly effective in combination with a viral active and/or anti-microbial component as graphene oxide has anti-viral or anti-microbial properties. The two-dimensional structures, sharp edges, and negatively charged surfaces of graphene oxide (GO) can kill bacteria and viruses by disrupting their lipid membrane (for bacteria) and/or by oxidising the membrane.

The inks comprise a viral active and/or anti-microbial component, which means that the ink may comprise at least one of a component that is anti-viral in nature, a component that is virucidal in nature, a component that is anti-microbial (e.g. antibacterial/germicidal), or a combination of these (e.g. a component that is both anti-viral and virucidal in nature).

The surfaces and/or edges of the graphene and/or graphene oxide particles are loaded (adhered) with the viral active and/or anti-microbial component. The planar shape of graphene and graphene oxide allows for a relatively low concentration of graphene and/or graphene oxide in a dispersion to be loaded with a high concentration of anti-viral or viricide on the surfaces of the graphene and/or graphene oxide particles. By loading it is meant that the viral active and/or anti-microbial component may be adsorbed onto or otherwise attached to the surface of the graphene and/or graphene oxide particles. For example, this may be covalent bonding to the surface (in other words, the graphene and/or graphene oxide may be functionalised with the viral active and/or anti-microbial component) or adhered through hydrogen bonding, van der Waals, or a combination of bonding mechanisms. In some embodiments, the primary bonding involved in adhering is hydrogen bonding. In this form, the antiviral performance of the component has been shown to increase, while reducing their toxicity.

In some embodiments, the viral active and/or anti-microbial component comprises metal ions (e.g. silver ions, copper ions), metal nanoparticles (e.g. silver nanoparticles, copper nanoparticles), curcumin and/or hypericin. These may be provided individually or in combination. For example, in one embodiment the ink comprises silver nanoparticle functionalised graphene oxide and in another embodiment the ink comprises curcumin and silver nanoparticle functionalised graphene oxide. In embodiments where the component is metal nanoparticles, the nanoparticles may have a particle size of 1 to 100 nm, for example 1 to 80 nm or 1 to 40 nm, for example 10 to 40 nm. This may be an average particle size (i.e. a number average particle size) and calculated on the basis of the particle size when adhered to the graphene and/or graphene oxide. This can be measured using SEM. The metals used as ion/nanoparticles mentioned above include transition metals, such as V, Ti, Cr, Co, Ni, Cu, Zn, Tb, W, Ag, Cd, Au, Hg, as well as other metals including Al, Ga, Ge, As, Se, Sn, Sb, Te, Pb and Bi. Preferably, the metal of the metal ions or nanoparticles are Ag or Cu. These may have a particle size of 1 to 100 nm, for example 1 to 80 nm or 1 to 40 nm, for example 10 to 40 nm. In some cases, the particle size is such that at least 80% of the particles have a size between 1 and 100 nm, optionally 80% of the particles being between 20 and 60 nm, optionally 95% between 20 and 60 nm.

In some embodiments, the graphene and/or graphene oxide particles have a surface coverage of the viral active and/or anti-microbial component of from 1% to 60%. This can be 1-20%, e.g. 1-10% or 3-10% or even 10-60% or 20-60%. This can be determined using SEM, for example EDS-SEM or EDX-SEM.

In some embodiments, the graphene and/or graphene oxide particles and viral active and/or anti-microbial component combined have a weight content of from 1% to 60%, for example, 1 to 30 wt %, 1 to 20 wt %, 1 to 5 wt % or 5% to 60% wt % viral active and/or anti-microbial component. For metal nanoparticles, in embodiments this can be 1-20 wt %, e.g. 1-10 wt %, 3-10 wt % or 5-10 wt %. This can be determined using thermogravimetric analysis (TGA). For example, where metal ions or metal nanoparticles are used, the TGA can comprise (i) heating to 120° C. in air to drive off any moisture, followed by heating to 900° C. to burn off the graphene/graphene oxide, leaving only non-combustible materials (metals). The % metal content can be calculated by: % metal content=(% Mass at 900° C./% Mass at 150° C.)×100.

In some embodiments, the graphene and/or graphene oxide particles have a particle size of between 100 and 2000 nm. For example, a number average particle size of between 100 nm and 2000 nm. This can be a largest dimension (e.g. a diameter). This can be measured by SEM, or by laser light scattering or PCS (photon correlation spectroscopy). In some embodiments, this is a number average particle size. This can be a largest dimension (e.g. a diameter). This can be measured by SEM, by laser light scattering or PCS (photon correlation spectroscopy). In an embodiment, the graphene and/or graphene oxide is provided in the form of platelets. The graphene or graphene oxide platelets can have an average particle size (i.e. a number average particle size) in the lateral dimension (i.e. at the greatest width across the face of the platelet) of between 100 and 2000 nm. Number average thickness of the platelets can be less than 200 nm, e.g. less than 100 nm, less than 50 nm, less than 10 nm, less than 5 nm or less than 1 nm. These measurements can all be measured by SEM. The platelets can comprise single or multiple layers of graphene or graphene oxide.

In some embodiments, the surfaces and/or edges of the graphene and/or graphene oxide particles are functionalised with the viral active and/or anti-microbial component. Functionalisation of the edges may improve performance, as it is thought that it is the edges of the graphene and/or graphene oxide are involved in the disruption of the membranes of viruses, and so the presence of viral active and/or anti-microbial component on the edges may enhance this. Oxygen groups on the surface can also oxidise lipid membranes causing them to rupture. The presence of functional groups (e.g. polar moieties) on the edges of the graphene and/or graphene oxide, can also be used to promote loading of the viral active and/or anti-microbial component on the edges.

In some embodiments, the graphene and/or graphene oxide particles are functionalised particles, for example comprising functional groups selected from thiols, hydroxyl, carboxyl, epoxyl and/or carbonyl groups. In some embodiments, the graphene oxide is functionalised graphene oxide and comprises a thiol functional group. When used with nanoparticles, for example viral active and/or anti-microbial nanoparticles, the presence of the thiol group can help to reduce the size of the nanoparticles (e.g. smaller silver nanoparticles on the surface of the graphene/graphene oxide). Smaller nanoparticles tend to improve anti-viral/microbial activity by their higher effective surface area.

In some embodiments, the graphene particles are functionalised with oxygen-containing functional groups and have an oxygen content of from 10 to 30%, for example 10 to 25%. In some embodiment the graphene oxide particles have an oxygen content of from 24 to 40%. For example, greater than 25% to 40%. Oxygen levels have a direct effect on the virucidal efficacy of the product, the higher the better, up to a limit. However, above this level the ink or coating becomes more prone to moisture damage. Increased performance is thought to at least partly come from the viral active/anti-microbial components being (e.g. individual silver particles), being available at well-spaced intervals on the graphene oxide scaffold. Hence, significant amounts of oxygen species, allow for more spacing. Reducing graphene oxide can therefore lower performance. Therefore, in embodiments, the materials are manufactured in such a way that the graphene oxide is not reduced. Oxygen levels can be measured by EDS-SEM or EDS-SEM.

In an embodiment, the ink is a solution or suspension and the carrier is a solvent. Alternatively, the ink may be a paste comprising a binder as a carrier; however, it is preferable to have the carrier in the form of a solvent. In embodiments, the ink may comprise 0.05-10, for example 0.1-10 mg/ml of the combined active agent (i.e. graphene/graphene oxide combined with the anti-viral/anti-microbial component) in a solvent, for example, 1-5 or 2-4 mg/ml. In some embodiments, the ink further comprises (i) a binder, optionally selected from cellulose acetate, cellulose acetate butyrate, diethyl phthalate, poly(methyl methacrylate), poly(ethylene glycol) and polyvinylpyrrolidone (PVP); (ii) a drying agent; and/or (iii) a rheology modifier. In another embodiment, the ink may further comprise cationic particles, such as cationic polyurethane. This can be, for example, cationic colloidal particles, such as cationic colloidal polyurethane. This enables adhesion using electrostatic properties to negatively charged surfaces, such as polyester or polypropylene.

In an embodiment, the viral active and/or anti-microbial component comprises a capping agent. A capping agent is typically a compound comprising a polar section and a non-polar (hydrocarbon) chain. For example, the viral active and/or anti-microbial component may be provided with a capping agent, such as polyvinylpyrrolidone (PVP). For example, in an embodiment, the viral active and/or anti-microbial component comprises capped (e.g. PVP-capped) metal (e.g. silver) nanoparticles. The capping agent can be a polymeric capping agent, for example, polyethylene glycol (PEG), ethylenediaminetetraacetic acid (EDTA), polyvinyl pyrrolidone (PVP) and polyvinyl alcohol (PVA). The capping agents can form a protective shell around the viral active and/or anti-microbial components and bond to the surface of the graphene and/or graphene oxide using hydrogen bonding. It has been found that, although capping agents can be mild reducing agents, an excess of the capping agent provided in a solution when preparing the composition allows for capping of the viral active/anti-microbial and hydrogen bonding to the functional groups on the graphene/graphene oxide. In embodiments, the viral active and/or anti-microbial component is a capped metal nanoparticle. When provided on the nanoparticle the polar section coordinates to the metal, with the non-polar chain extending outwardly.

In a second aspect, there is provided a viral active and/or anti-microbial article comprising:

a substrate; and a coating provided on the substrate, wherein the coating comprises:

(i) graphene and/or graphene oxide particles: and (ii) a viral active and/or anti-microbial component adhered to the graphene and/or graphene oxide particles.

Such articles can comprise PPE, such as facemasks, gloves, protective clothing or may be in the form of cleaning articles, such as anti-viral or virucidal or antibacterial cleaning fabrics. The presence of the graphene and/or graphene oxide and a viral active and/or anti-microbial component provides the article with all of the advantages described herein associated with the combination of these components in an article. These can be advantageous over existing products, as most approved anti-bacterial or anti-viral compositions include bleach, which is not always appropriate and can be toxic. In some embodiments, the article may comprise the ink of an embodiment disclosed herein.

The properties of the graphene and/or graphene oxide, and viral active and/or anti-microbial components can be the same as those set out in respect of the inks. For example, in some embodiments, the viral active and/or anti-microbial component comprises metal ions, metal nanoparticles, curcumin and/or hypericin. In some embodiments, the surfaces and/or edges of the graphene and/or graphene oxide are loaded with the viral active and/or anti-microbial component. In some embodiments, the graphene and/or graphene oxide particles are functionalised particles and can comprise functional groups selected from thiols, hydroxyl, carboxyl, epoxyl and/or carbonyl groups. In some embodiments, the graphene oxide is functionalised graphene oxide and comprises a thiol functional group.

The substrate can be any material that can act as a matrix for the graphene and/or graphene oxide particles, and viral active and/or anti-microbial components. The substrate can be a layer of a particular material. The substrate may comprise a cellulosic material (such as cotton or paper), a textile, or a material such as polyester or polypropylene. Cellulosic materials are attractive as they are low cost, widely available and straightforward to incorporate into existing PPE. In one embodiment, the substrate comprises polyester or polypropylene. Polyester can be particularly effective as it can be responsible for the entrapment of viruses, including the virus responsible for Covid-19 disease (i.e. SARS-CoV-2). Polyesters form a group of polymers with a high susceptibility to static electricity and a long lifetime of charges generated on surface and in volume. This feature results from a low number of free charges and a low electric conductance. The substrate may be a woven or non-woven.

In an embodiment, the article is a filter and the substrate is a filtration membrane provided in the filter to filter particulates passing through the filter. The coating may be provided on at least one surface of the filtration membrane. This can be, for example a filter for a mask or a filter for an air processing unit (e.g. HVAC). In an embodiment, the filter comprises a first filtration layer comprising the substrate and a second filtration layer, wherein the first filtration layer is provided upstream of the second filtration layer.

In an embodiment, the filter comprises a first filtration layer comprising the substrate and a second filtration layer, wherein the first filtration layer is provided upstream of the second filtration layer. By upstream it is meant that when the majority of flow in normal use travels in a first direction, the second filtration layer is downstream of the first filtration layer. The second filtration layer may be adapted to prevent passage of the graphene and/or graphene oxide particles. Graphene oxide and graphene can be harmful and so this provides the benefits associated with their use, while ensuring that any that could detach from the substrate are retained within the filter.

In an embodiment, the filter comprises at least one fine filtration membrane having a filtration efficiency of at least 95% for particles having a size of 0.3 μm; and the filtration membrane comprising the graphene and/or graphene oxide particles and a viral active and/or anti-microbial component is a coarse filtration membrane. In other words, the substrate/filtration membrane comprising the viral active and/or anti-microbial component (anti-viral/viricide/germicide) is provided outwardly relative to the fine filtration membrane. For example, where the filter is used in a face mask, the fine filtration membrane is provided closest to the user. This is a particularly effective arrangement as the ink traps the exhaled and inhaled water droplets which carry the viral material and adsorbs them onto the ink where the active viral active ingredient inactivates or kills the virus and/or the antimicrobial active ingredient kills the microbe (e.g. bacteria). Coarse is relative to the fine filtration membrane. For example, the coarse filtration membrane may have a filtration efficiency of at least 95% for particles having a size of 3.0 μm. Moreover, this can reduce the risk of inhalation of graphene and/or graphene oxide particles.

In a third aspect, there is provided a face mask comprising an article and/or a filter as disclosed herein.

In a fourth aspect, there is provided a method of producing an ink comprising:
(a) combining graphene and/or graphene oxide particles with a viral active and/or anti-microbial component to adhere the viral active and/or anti-microbial component to the graphene and/or graphene oxide particles; and
(b) dispersing the combined graphene and/or graphene oxide particles and viral active and/or anti-microbial component in a carrier.

In an embodiment, the method comprises:
dispersing graphene and/or graphene oxide particles in a solvent;
combining the graphene and/or graphene oxide particles with a viral active and/or anti-microbial component to adhere the viral active and/or anti-microbial component to the graphene and/or graphene oxide particles; and
dispersing the combined graphene and/or graphene oxide particles and viral active and/or anti-microbial component in a carrier.

In an embodiment, the method comprises combining graphene and/or graphene oxide particles with a viral active and/or anti-microbial component comprises dispersing graphene and/or graphene oxide particles in a carrier, followed by addition of the viral active and/or anti-microbial component to the carrier. In an embodiment, the viral active and/or anti-microbial precursor is added to the solution and the method comprises converting the precursor into the viral active and/or anti-microbial component in situ. This can, for example, be a metal salt that is converted to metal ions and/or metal particles (e.g. nanoparticles) in situ, for example by a reduction. In this embodiment, if functionalised graphene and/or (functionalised or non-functionalised) graphene-oxide is present, this may also be reduced during the reduction of the metal salt (co-reduction).

In an embodiment, the viral active and/or anti-microbial component is a metal nanoparticle, and the metal nanoparticle is combined with graphene and/or graphene oxide particles.

In an embodiment, a metal ion or metal nanoparticle is used as the viral active and/or anti-microbial component and is formed (e.g. by reducing a metal salt to form the metal nanoparticle) prior to step (a). That is, it is formed before it is combined with the GO. Therefore, the reaction forming the metal ion or nanoparticle (in embodiments, a reduction of a metal salt) does not impact the functional groups present on the (functionalised) graphene and/or graphene oxide. Thus, in an embodiment, the graphene is a functionalised graphene, and the step (a) comprises combining functionalised graphene and/or (functionalised or non-functionalised) graphene oxide with a viral active and/or anti-microbial precursor, followed by addition of a reducing agent to reduce the viral active and/or anti-microbial precursor to form the viral active and/or anti-microbial component.

In some embodiments, the method further comprises the step of functionalising the graphene and/or graphene oxide particles prior to step (a), The step of functionalising the graphene and/or graphene oxide may comprise functionalising the graphene and/or graphene oxide particles with at least one functional group selected from thiol, hydroxyl, carboxyl, epoxyl and/or carbonyl groups. In one embodiment, the functional group is a thiol. For example, this may be achieved by thiolisation using NaSH.

In some embodiments, the solvent may be the carrier. Alternatively, the combined graphene and/or graphene oxide and viral active and/or anti-microbial component may transferred into a carrier.

In some embodiments, the graphene and/or graphene oxide particles will disperse into a thin layer of nanosheets. These nanosheets may be aligned or misaligned, depending on the specific viral active and/or anti-microbial component. The solvent is preferably an alcohol (e.g. methanol or ethanol) or water. Sonication of graphene and/or graphene oxide can also be used to reduce the particle size of the graphene/graphene oxide through breakage.

In some embodiments, combining the graphene and/or graphene oxide particles with a viral active and/or anti-microbial component comprises loading the viral active and/or anti-microbial component onto the graphene and/or graphene oxide. In some embodiments, the graphene and/or graphene oxide particles may be functionalised with the viral active and/or anti-microbial component.

In an embodiment, the viral active and/or anti-microbial component is provided with a capping agent.

In a further embodiment, the method may comprise, prior to step (b), isolating the combined graphene and/or graphene oxide particles and viral active and/or anti-microbial component.

In a fifth aspect, there is provided a method of manufacturing an article as defined herein, the method comprising applying an ink as defined herein to a substrate. In the methods set out herein, the ink can be applied to the substrate by printing. This is particularly advantageous as it allows for straightforward incorporation of this functionality into existing products and in existing manufacturing processes. In embodiments, printing can include spray coating, inkjet printing, dip coating, screen printing, gravure printing, flexographic printing, slot die coating, doctor blade coating. In some embodiments, where the substrate comprises a fabric such as cotton or polyester, the printing comprises spray coating, inkjet printing, dip coating and is adapted to provide a single layer thickness of graphene and/or graphene oxide particles onto the fabric. In other embodiments, where the substrate comprises a cellulosic material, the printing comprises screen printing or gravure printing. This may require higher viscosity ink.

In a sixth aspect, there is provided a composition, comprising: functionalised graphene and/or (functionalised or non-functionalised) graphene oxide particles; and a viral active and/or anti-microbial component adhered to the functionalised graphene and/or graphene oxide particles, wherein the viral active and/or anti-microbial component comprises capped metal nanoparticles. By capped metal nanoparticles, it is meant metal nanoparticles that have a capping agent attached to them. The specifics of each of these parts of the composition are in line with those disclosed in respect of the other aspects. For example, the capping agents and properties of the nanoparticles, etc., are in line with those disclosed in respect of the other aspects. For example, in one embodiment, the composition comprises graphene oxide and PVP-capped silver nanoparticles. For example, the capped materials can have a metal (e.g. silver) content, in the range of 1-20 wt %, for example 1-10 wt %.

The capping agents (e.g. PVP) added to the metal results in hydrogen bonds to the functional groups on the functionlised graphene and/or GO, particularly in areas where oxygen is present (which tends to be around the edges). This bonding closely adheres the particles to the graphene/graphene oxide, while also encouraging spacing between the nanoparticles (defined by the spread of functional groups). This spread avoids or reduces agglomeration of the nanoparticles. This is one reason that oxygen-containing functional groups are particularly effective.

In a seventh aspect, a composition comprising (i) graphene and/or graphene oxide particles dispersed; and (ii) a viral active component adhered to the graphene and/or graphene oxide particles (e.g. the ink as defined herein or an article as defined herein) is used as an anti-viral or viricide for Sars-CoV-2.

BRIEF DESCRIPTION OF THE DRAWINGS

Embodiments of the invention will now be described with reference to the accompanying figures, in which:

FIG. 1 shows a schematic view of a mask according to an embodiment of the invention;

FIG. 2 shown an exploded schematic view of a filter according to an embodiment of the invention; and FIG. 3 shows a further embodiment of the invention;

FIG. 4 shows particle sizes of Examples 9 to 11;

FIG. 5 shows SEM images of Example 9; and

FIG. 6A, 6B, 6C, 6D, FIG. 7, FIG. 8, FIG. 9, and FIG. 10 show the results of plaque assays performed to measure anti-viral performance.

DETAILED DESCRIPTION

As set out above, graphene and graphene oxide enhance the anti-viral or virucidal properties of viral active compounds or components. The same is true of an anti-microbial, such as an anti-bacterial. These components may be single components (e.g. a single composition or structure) or multiple, combined components.

Where a virucidal material is used, there is a particular advantage over existing methods and anti-virals in general in that the virus is deactivated. Some environments have such high levels of concentrations of a particular virus and a user will be exposed for significant periods of time. In these environments, while preventing further replication of the virus can be helpful, the significant levels in the environment mean that the concentration can still lead to a high risk of infection. Virucidal materials in such an environment are useful as they will deactivate or destroy the virus that is present, rather than just preventing replication, for example.

By ink, it is meant a liquid (solution or suspension) or paste comprising the graphene and/or graphene oxide particles and viral active and/or anti-microbial component, and a carrier. An ink has properties which allow particular components of the ink (in this case, graphene and/or graphene oxide particles and viral active and/or anti-microbial component) to be deposited onto a substrate. The carrier may be a solvent, for example water or an alcohol (e.g. ethanol). Therefore, in some embodiments, the ink is a suspension comprising the (i) graphene and/or graphene oxide particles and (ii) the viral active and/or anti-microbial component. The ink need not necessarily be coloured (i.e. may be colourless), but may be coloured (e.g. as a result of the presence of graphene or graphene oxide).

Other components of the ink can include additional solvents, rheology modifiers, binders, drying agents, and/or polymers. In embodiments, the ink further comprises a binder, for example cellulose acetate, cellulose acetate butyrate, diethyl phthalate, poly(methyl methacrylate) and poly(ethylene glycol). Binders can be used as a soluble additive in the dispersion which, upon drying, would precipitate out and adhere the particles to a substrate/matrix (e.g. a fabric). In an embodiment, the ink further comprises a drying agent. These are chemicals which alter the cross-linking rate of the binders (usually react with the oxygen in the air) and contribute to how the inks solvent is absorbed into a material. Embodiments may include mineral-based drying agents, such as alumina and silica. In some embodiments, the ink further comprises a rheology modifier (e.g. hydroxypropyl cellulose, polyol compounds (e.g. glycerol) and/or PVA). These adjust the flow properties of the ink. For example, additives are required for screen printing to make the ink shear sensitive which allows the ink to pass through the mesh under shear but then return to a higher viscosity on the surface. In another embodiment, the ink comprises a gel reducers. These improve the properties of the ink for use with cellulosic materials to reduce the tack of the ink which would pick the short cellulosic fibres from the surface. In some embodiments, the ink can comprise poly(ethylene glycol), which can act as a rheology modifier, a binder, and a drying agent. An additional solvent can include methyl ethyl ketone, which can lower the evaporation temperature. Other additives that can be present in embodiments (with the above additives, or instead of) include dispersing agents and/or wetting agents, for example Polyethylene oxide—Polypropylene oxide (dispersing), Polyethylene glycol sorbitan monooleate (dispersing), Polyethylene glycol hexadecyl ether (dispersing), Polyoxyethylene (40) nonylphenyl ether (dispersing), and silicone additives (wetting).

In some embodiments, the ink further comprises a film-forming additive or agent. By this, it is meant an additive that encourages or causes the formation of a film of the graphene/graphene oxide particles. These can be particularly advantageous additives, as they help to provide a uniform coating across the surface of the material on which the ink is applied. This provides improved coverage and thus improved efficacy, and reduces waste (e.g. the film can be only a single-layer film, or have only a few layers). In embodiments, the film-forming additive is selected from PVP, acrylates, acrylamides, copolymers (e.g. maleic anhydride copolymer), PVA, and/or polyethylene oxide (polyethylene glycol).

Graphene layer is a two-dimensional allotrope of carbon with a single layer of graphene includes a single planar sheet of sp2-hybridized carbon atoms. Graphene is known for its exceptionally high intrinsic strength, arising from this two-dimensional (2D) hexagonal lattice of covalently-bonded carbon atoms. Further, graphene also displays a number of other advantageous properties including high conductivity in the plane of the layer. Graphene oxide is a layer of graphene which has been functionalised with a number of oxygen-containing groups. For example, the layer may comprise hydroxyl, carboxyl, epoxyl and/or carbonyl groups. Graphene oxide provides advantages in that it has been shown to have anti-viral or anti-bacterial properties. Conversely graphene can be particularly advantageous in that it is easier and more environmentally friendly to manufacture. Oxygen functionalised graphene can be produced using a plasma functionalisation process and can provide graphene with similar functionality to graphene oxide but in an environmentally friendly manner. In some embodiments, functionalised graphene and/or (functionalised or non-functionalised) graphene oxide is used. The functionalisation can improve adherence of the viral active and/or anti-microbial component and the viral active and/or anti-microbial properties.

An example of oxygen functionalised graphene is shown below:

An example of graphene oxide is shown below:

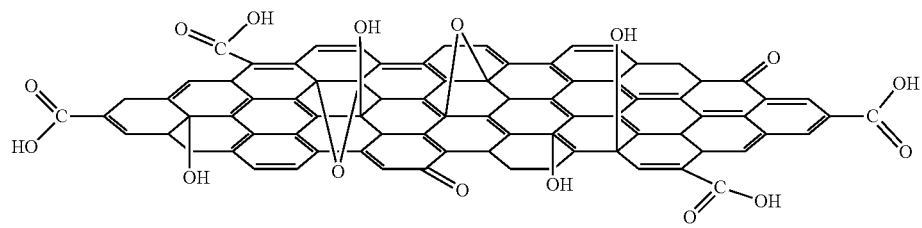

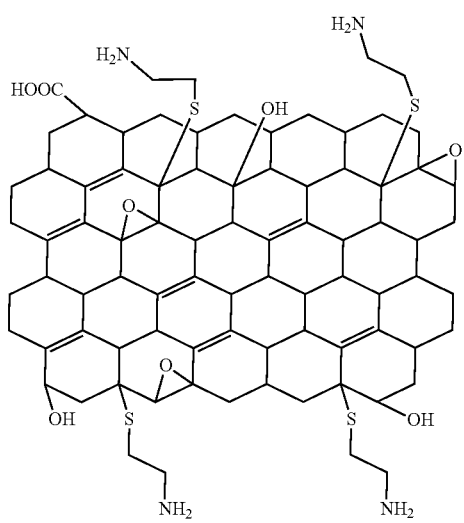 [SMILES: NCCSC12CC3CC45OC4C4(SCCN)CC(O)C6=C7C8C(CC6)C6=C9C%10=C%11C(CC%12CC%13CC%14CCC%15%16OC%15CC%15C%17CCC(CC1O)C1=C2C2C3C3=C5C(C5=C%18C3C3C%19=C%20C(C%13C%13(O)C%19C%18C%18(OC9%18C58)C%11(SCCN)C%12%13)C%14C%16(SCCN)C%15C%20C(C1%17)C32)C74)C(C(=O)O)CC%10CC6]

In some embodiments, the graphene or graphene oxide comprises at least 1 atomic layer of graphene or graphene oxide, at least 5 atomic layers, at least 10 atomic layers of graphene or graphene oxide e.g. up to 15 atomic layers of graphene or graphene oxide. In some embodiments, the graphene or graphene oxide comprises from 1 atomic layer of graphene to 15 atomic layers of graphene or graphene oxide.

In some embodiments, the graphene and/or graphene oxide particles may be functionalised. That is, in embodiments, the graphene may be and/or the graphene oxide may be treated to incorporate functional groups on the surface and/or edges of the graphene and/or graphene oxide particles (depending on the initial method of manufacture of the graphene oxide, this may be a further functionalisation). This can be via covalent bonding, for example. Example functional groups include comprise thiol, hydroxyl, carboxyl, epoxyl and/or carbonyl groups. In one embodiment, thiol functional are used to functionalise the graphene and/or graphene oxide particles. Functionalisation can improve compatibility with a solvent or other components and thus improve the qualities of the ink. For example, this can improve the dispersion of the graphene and/or graphene oxide particles in an ink and avoid clumping or agglomeration. This can be, for example, functionalising using plasma treatment. For example, in some embodiments graphene may be functionalised using (additional) carboxyl groups. One example is a plasma treatment of "oxygen" functionalisation using the Haydale HDLPAS process, which is set out in WO 2010/142953 A1. Functionalisation can also improve the compatibility and loading of the viral active and/or anti-microbial components.

In an embodiment, the viral active and/or anti-microbial component comprises silver nanoparticles. For example, in some embodiments the viral active and/or anti-microbial component in the ink is a graphene oxide to which silver nanoparticles are adhered. The silver nanoparticles are chemically bound to the surface of the graphene oxide. This is very effective as both a virucide and an antibacterial agent. In some embodiments, where nanoparticles, such as silver nanoparticles are used, the loading can be up to 80%, for example up to 60% (by weight and/or surface coverage). By leaving some of the graphene/graphene oxide surface exposed, this allows the trapping of the target materials (e.g. virus of bacteria). For nanoparticles with a particle size of 1-10 nm, this can in some embodiments be 30-60% loading by weight. For nanoparticles with a particle size of 30-40 nm, this can in some embodiments be 5-20% loading.

Combinations that have been found to be particularly effective embodiments are metal nanoparticles as the viral active and/or anti-microbial component adhered to functionalised graphene and/or graphene oxide particles. In particular, silver nanoparticles adhered to either functionalised (with oxygen-containing functional groups) graphene or graphene oxide. This is particularly effective when a capping agent such as PVP is used to cap the nanoparticles. Preferred loading includes 1-10 wt % silver (compared to total combined weight, as detailed above), e.g. 4-6 wt %, on the graphene/graphene oxide. This helps to ensure good coverage, without overloading and agglomeration. Where present as an ink, these combinations are preferably at a concentration in a liquid vehicle or solvent 0.5-5% (i.e. 0.5-5 mg/mL). In these embodiments, an effective particle size of the silver nanoparticles was found to be preferably 1-40 nm, even more preferably 5-20 nm. This can be even more effective when a film forming agent is included in the ink.

A first embodiment of the invention is shown in FIG. 1. In this figure, a mask 100 according to an embodiment is shown schematically. The mask comprises a main body 110 and a filter 120. The main body 110 is shaped to fit over a user's face and cover the user's nose and mouth, forming a seal with the face around the edge of the main body. The main body is formed of material that is either substantially impermeable to air or provides a high level of filtration to provide more resistance and filtering than the filter 120. The filter 120 is located in a hole extending through the main body 110. The filter 120 is designed to allow passage of air therethrough and thus provides an airflow pathway (i.e. a path of least resistance) through the mask. This arrangement means that, when a user inhales, air is drawn through the filter 120. No air can directly enter the user's lungs (due to the seal), nor can it pass through the impermeable main body 110. Although not shown, straps are provided which hold the mask onto a user's face. In this embodiment, the filter 120 comprises one of the coatings disclosed herein. For example, in one embodiment, the filter 120 comprises a layer comprising a matrix and a silver-functionalised graphene oxide material coated on the matrix. This means that, as a user inhales, any virus present in the environment will pass through the filter 120 and come into contact with the layer comprising the silver-nanoparticle functionalised graphene oxide material. The virucidal properties of this material will deactivate or destroy the virus and thus prevent or reduce the risk of infection of the wearer.

Figure 2:
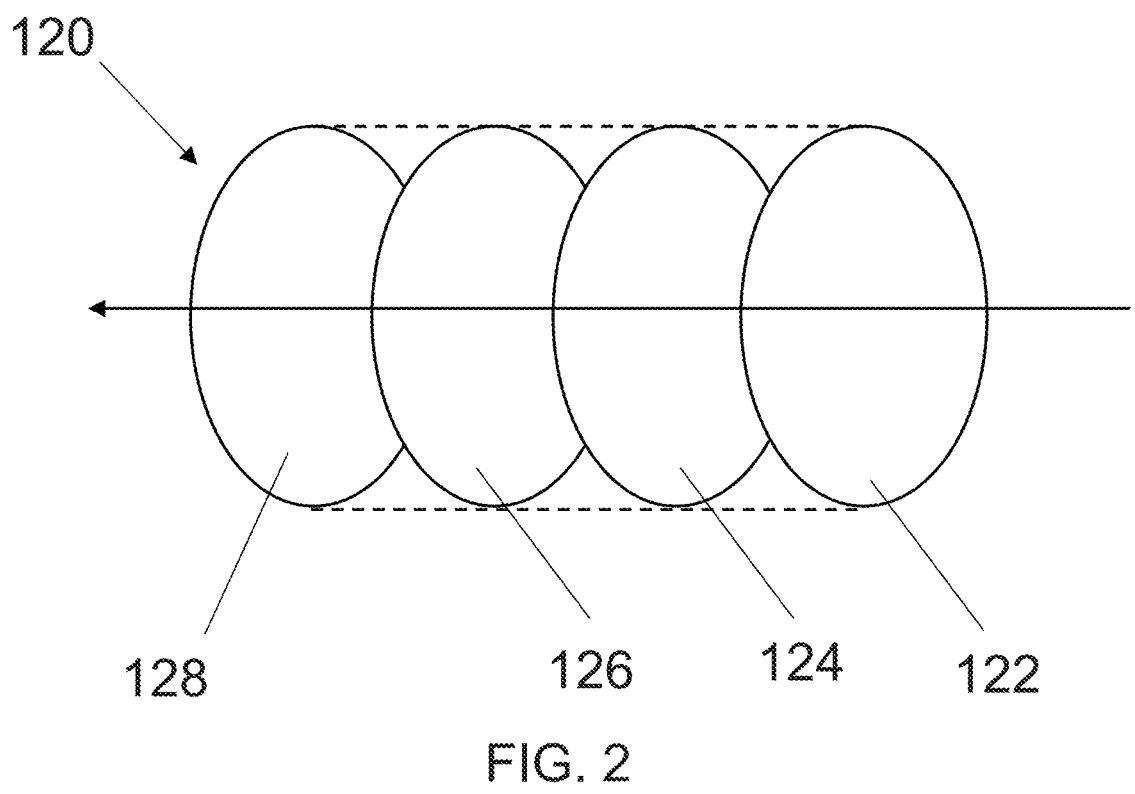

One embodiment of the filter 120 is shown in more detail in an exploded schematic view in FIG. 2. The filter 120 in this embodiment comprises a number of layers 122, 124, 126, 128 located within a frame (not shown). Outer cover 122 is the outermost layer and is the one that will be exposed to the outside environment during use. This outer cover 128 can be a polyester or polypropylene fluid resistant cover which provides an initial screen to prevent significant water or dirt ingress into the filter 120. The layer behind (i.e. closer to the user) the outer cover is a pre-filter 124. In this embodiment, the pre-filter 124 comprises a layer with a filtration efficiency of greater than or equal to 95% for above 3.0 µm sized particles. This pre-filter 124 can comprise a polyester layer (e.g. a non-woven polyester layer). In this embodiment, the pre-filter 124 is also coated with one of the coatings disclosed therein. For example, it can be coated with silver-nanoparticle functionalised graphene oxide material. This can, for example, be manufactured by printing an ink according to an embodiment onto the polyester material, for example on the outer face of the polyester layer to maximise exposure to the water droplets which contain the viral material. Behind the pre-filter 124 is a filter membrane 126. The filter membrane 126 comprises a layer with a filtration efficiency of greater than or equal to 95% for above 0.3 µm sized particles. This layer can comprise a polyester layer. Behind the filter membrane 126 is an inner cover 128. The inner cover 128 forms the innermost layer relative to the user. In some embodiments, this layer is polyester, polypropylene or cotton.

The filter 120 of the embodiment of FIG. 2 can be easily manufactured by applying ink according to embodiments of the invention to a base material, such as a polyester, cotton or cellulose layer. This can be incorporated into existing manufacturing processes and without requiring specialist materials or equipment, thereby allowing for mass production of filters 120 and masks 100. For example, the ink can be printed onto a surface of a filter material, such as a polyester, cotton or cellulose layer, for example using an inkjet printer.

Advantageously, masks 100 and filters 120 according to the above embodiment allow, the filter layers and coating (formed by applying the ink to a filter material) traps the water droplets which carry the virus (for example, SARS-CoV-2) and adsorbs them onto the ink where the active ingredient inactivates or kills the virus. This arrangement is particularly effective where viruses are transmitted through respiratory droplets. For example, the COVID-19 virus is believed to be transmitted mainly via small respiratory droplets initiated through sneezing, coughing, or when people interact with each other for some time in close proximity (usually less than one metre). These droplets can then be inhaled, or they can land on surfaces that others may come into contact with, who can then get infected when they touch their nose, mouth or eyes. Thus, use of a mask 100 will provide protection for users of the masks and those around them.

This is particularly effective when the layer of the filter 120 on which the viral active and/or anti-microbial component is applied is polyester. Polyester fabric provides a very effective mechanism for the entrapment of viruses, including the SARS-CoV-2 virus. Polyesters form a group of polymers with a high susceptibility to static electricity and a long lifetime of charges generated on surface and in volume. This susceptibility to electrostatic charge is utilised in the filters to attract the water droplets to the filter. These virus containing water droplets will then be adsorbed onto the graphene layer coating the filter thus exposing the viral material to the attached viral active and/or anti-microbial compounds (e.g. silver particles). Indeed the electrostatic nature of the fibres will help reduce the penetration of the not only the water droplets but particulates as well.

The provision of the ink on a pre-filter is unexpectedly advantageous. Although the first instinct might be to coat the filter membrane 126 having the highest degree of filtration with the ink, the more coarse pre-filter layer is sufficient for the purpose of attracting and trapping the target droplets. Although the COVID-19 virus itself is around 140 nm in size, the water droplets carrying the virus have an overall average size distribution of 0.62-15.9 µm, with 82% of droplet nuclei centred in 0.74-2.12 µm with a mode size of 8.35 µm. The size distribution of coughed droplets is multimodal, indicating that the size distribution has three peaks, at approximately 1 µm, 2 µm, and 8 µm. This makes the droplets an ideal size to be trapped directly in the pre-filter 124 for the coarse droplets, and through electrostatic interaction for the finer droplets, making this an efficient filtering system for droplets of this size range.

Although in the embodiment described above with reference to FIG. 2, the ink was applied to the pre-filter to form a coating on a matrix, the coating could instead be applied to any of the other layers to provide an effective anti-viral/virucidal filter. For example, application to an inner face of the outer cover 122 would also provide significant contact with viral material. In other embodiments, it may be provided on the inner cover 128 or the filter membrane 126. In some embodiments, the ink could be applied to plural layers of the filter 120.

In further embodiments, the ink or coating may be applied to other PPE, such as gloves. In this way, should a user wearing the gloves contact a surface containing a virus, the ink or coating will reduce the risk of infection or transmission by inactivating the virus.

Figure 3:
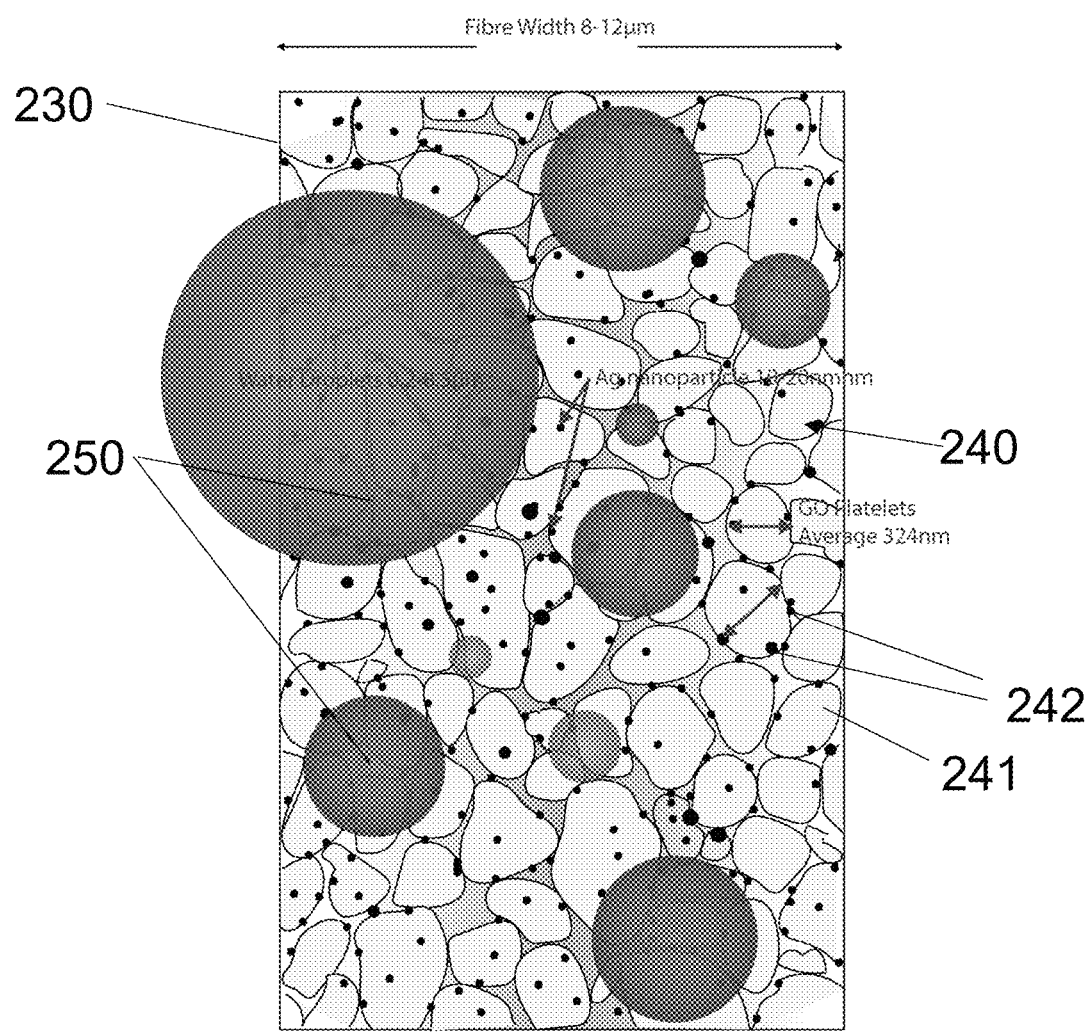

FIG. 3 shows a schematic view of a fibre 230 of an article that has been coated with particles 240 comprising graphene oxide platelets 241 loaded with Ag nanoparticles 242. The fibre has a width of 12 µm, the Ag nanoparticles 242 have a particle size of 1-2 nm and the graphene oxide platelets 241 have a particle size of 324 nm. Also illustrated are water droplets 250, which range in size from 0.2 to 8.5 µm. The graphene oxide 241 platelets have formed a uniform film across the fibre 230.

The ink and articles disclosed herein can be manufactured as follows:
- (step (i) is optional) functionalising graphene and/or graphene oxide, for example using plasma functionalisation, to provide a functionalised graphene and/or functionalised graphene oxide;
- (ii) combining graphene and/or graphene oxide particles with a viral active and/or anti-microbial component to adhere the viral active and/or anti-microbial component to the graphene and/or graphene oxide particles; and
- (iii) dispersing the combined graphene and/or graphene oxide particles and viral active and/or anti-microbial component in a carrier.

Optional step (i) can improve the dispersibility of the graphene and/or graphene oxide particles in a solvent. It can also improve the adherence of the components loaded on the graphene and/or graphene oxides particles, particularly where oxygen-containing groups are functionalised on the surface and the viral active and/or anti-microbial component can adhere to these oxygen-containing functional groups (e.g. through hydrogen bonding). In one embodiment, this comprises thiolisation using Sodium Hydrosulphide (NaSH) to produce thiol functional graphene and/or graphene oxide particles.

Step (ii) can comprise e.g. dispersing graphene and/or graphene into a solvent or carrier and adding the viral active and/or anti-microbial component to the graphene and/or graphene oxide particles. This may comprise dispersing 0.1-10 wt % (e.g. 1-10, 1.0-10.0, 1-5, or 2-4 wt %) of the graphene and/or graphene oxide into a solvent or liquid vehicle. These concentrations are particularly effective as the graphene and/or graphene oxide particles will disperse into a thin layer a nanosheets. These nanosheets may be aligned or misaligned, depending on the specific viral active and/or anti-microbial component. The solvent or liquid vehicle is preferably an alcohol (e.g. methanol or ethanol) or water. In the case of water, 0.1-5 wt % (e.g. 1-5 wt % or 2-4 wt %) can keep the viscosity relatively low. This may also comprise adding a viral active and/or anti-microbial precursor to the solvent or carrier, followed by converting this to a viral active and/or anti-microbial component and loading it onto the graphene and/or graphene oxide particles. Alternatively, it may comprise adding the viral active and/or anti-microbial component to a solvent or carrier and adding the graphene and/or graphene oxide particles to the viral active and/or anti-microbial component. This can, for example, comprise adding a viral active and/or anti-microbial precursor to the solvent or carrier, followed by converting this to a viral active and/or anti-microbial component. The graphene and/or graphene oxide can then be added to the solvent or carrier. Precursors may comprise e.g. metal salts.

Step (ii) leads to loading the viral active and/or anti-microbial component onto the graphene and/or graphene oxide particles. For example, loading may comprise further functionalising the graphene and/or graphene oxide particles with the viral active and/or anti-microbial component.

There are a number of specific methods that can be used to provide step (ii). For example, where metal nanoparticles are used as the viral active and/or anti-microbial component, the methods can comprise, for example, (i) direct addition of the viral active and/or anti-microbial nanoparticle to graphene/graphene oxide (e.g. Ag nanoparticles to GO or Ag nanoparticles to thiolised GO); (ii) reduction of a metal salt (e.g. silver salt, such as silver nitrate) in situ with the graphene and/or graphene oxide. Where the graphene is functionalised or where graphene oxide is present, if the reducing agent reduces the functional groups on the functionalised graphene/graphene oxide, this can be referred to as co-reduction. It has been found that direct addition can lead to improved anti-viral efficacy, particularly where functional groups are present on the graphene or (functionalised or non-functionalised) graphene oxide is used, as the functional groups are thought to assist in the efficacy of the graphene/graphene oxide. Avoiding reduction of these groups (particularly oxygen-containing groups) therefore retains high efficacy.

After step (ii), the combined viral active and/or anti-microbial mixture (i.e. the graphene and/or graphene oxide particles combined with the viral active and/or anti-microbial component(s)) can be dried to provide a dried viral active and/or anti-microbial mixture. However, such a mixture is difficult to handle and use in its dried form. It is therefore necessary to formulate an ink comprising the mixture to effectively use it in the manufacture of anti-viral/virucidal (i.e. viral active and/or anti-microbial) articles.

Step (iii) therefore comprises dispersing the combined graphene and/or graphene oxide particles with a viral active and/or anti-microbial component in a carrier. This can be achieved using a number of methods. This may comprise dispersing the graphene oxide and/or graphene combined with the viral active and/or anti-microbial agent in a solvent or liquid vehicle. The specific properties of the ink may depend on the surface or substrate onto which the ink is to be applied. Examples are provided below. For example, in some embodiments the graphene oxide and/or graphene combined with the viral active and/or anti-microbial agent can be dispersed in deionised water. Provided the graphene oxide and/or graphene combined with the viral active and/or anti-microbial agent is of the size and has the coverage disclosed herein, such a solution can be used to coat certain materials e.g. having an opposing electrostatic charge. In some embodiments, step (iii) occurs as step (ii) is carried out. That is, step (ii) may be carried out in a liquid vehicle or solvent and said vehicle or solvent forms the carrier of the ink. In other embodiments, the combined graphene and/or graphene oxide with adhered viral active/anti-microbial component is isolated from a solvent or vehicle used in the reaction of step (ii), and then separately dispersed in a carrier.

Other components of the ink can be added, for example, rheology modifiers, binders, drying agents and/or polymers. This can be at the same time as step (iii).

In some embodiments, the graphene oxide may be manufactured by functionalising graphene with oxygen containing functional groups (e.g. hydroxyl, carboxyl, carbonyl, epoxyl groups). For example, this may be plasma functionalisation. In these embodiments, the step of (i) functionalising graphene oxide may be further functionalisation (e.g. addition of further functional groups, such as a thiol group or additional groups that may already be present).

In one embodiment, an article comprises a film or wrap comprising a coating having combined graphene and/or graphene oxide with a viral active and/or anti-microbial component. The film or wrap can be quickly and easily applied to surfaces of any shape to provide protection against viruses and/or microbes. In a specific embodiment, this may be a multi-layer film whereby a (positively-charged) cellulosic film that has been coated with GO/Ag nanoparticles is bonded to a (negatively-charged) film substrate (e.g. PVC, PP, or BOPP, such as a cling film type substrate). The film layer facilitates application to most surfaces (e.g. through use of an adhesive or electrostatic forces) and the cellulosic layer puts the viral active ingredients on the touch surfaces.

Preparation of Graphene/Graphene Oxide Combined With a Viral-Active/Anti-Microbial Agent Reduction One embodiment comprises making a silver-nanoparticle graphene oxide ink using a reduction method. Graphene oxide nanoparticles with a diameter between 100 and 2000 nm are loaded with silver nanoparticles of diameters between 1 and 40 nm in size. The amount of silver decoration on the graphene oxide is defined by weight (as measured by Thermogravimetric Analysis (TGA)). The silver-nanoparticle graphene oxide ink can be manufactured according to the methods set out herein.

As an initial step, the silver-nanoparticle graphene oxide is manufactured as follows. A thiol grafted graphene oxide (i.e. thiol functionalised graphene oxide) can act as a base on which the silver nanoparticles are attached. The silver nanoparticles are produced via a modified Turkevich method of reducing silver nitrate to silver nanoparticles which are then attached to the graphene oxide plates through the thiol groups pre-attached to the graphene oxide surface. An example method is set out in Vi et al, The Preparation of Graphene Oxide-Silver Nanocomposites: The Effect of Silver Loads on Gram-Positive and Gram-Negative Antibacterial Activities, Nanomaterials 2018, 8, which is incorporated herein by reference. In this method different molar concentrations of silver nitrate content of up to 65% were achieved with a size of 1-2 nm. This contrasts to the size of the graphene oxide plates which are 1-2 µm in size. Another method is disclosed in Kim, J. D.; Yun, H.; Kim, G. C.; Lee, C. W.; Choi, H. C. Antibacterial activity and reusability of CNT-Ag and GO-Ag nanocomposites. Appl. Surf. Sci. 2013, 283, 227-233, which is also incorporated herein by reference.

Co-Reduction

In an alternative method, the silver-nanoparticle graphene oxide ink can be manufactured by manufacturing the silver-nanoparticle graphene oxide particles using addition of a silver salt (e.g. silver nitrate or silver acetate) solution to a graphene oxide containing solution. The silver nanoparticles are then precipitated out of solution by the addition of a reducing agent (e.g. selected from sodium citrate, trisodium citrate, citric acid, sodium borohydride or sodium hydroxide). This can be referred to as co-reduction, as both the silver salt and graphene oxide are reduced. This provides silver nanoparticles on reduced GO (rGO). This method the presence of the thiol group advantageously can lead to a particle size of the precipitate of 1-2 nm. After formation, the resultant material is then washed to remove unbound silver and excess salt from solution.

Direct Addition

Modified Viral Active/Antimicrobial Components

In an alternative method, commercially available silver nanoparticles with a capping agent (polyvinylpyrrolidone (PVP) or a citrated-based agent) can be obtained, and the loading onto the graphene oxide can be achieved by preferentially replacing the capping agent with the thiol groups present on the surface and edges of the graphene oxide. After formation, the resultant material is then washed to remove unbound silver and excess salt from solution.

Modifications

In an alternative method, other groups instead of a thiol group can be used to adhere the silver nano-particles. For example, in a modified version of PVP capped embodiment, (poly)ethylene glycol (PEG) (Precursor Example 4) or Polyethylenimine (PEI, $C_2H_5N)_n$) can be used to both reduce a silver salt and act as the binder between the silver nanoparticle and the graphene oxide. In this instance, different molecular weights of the PEG can give varying reducing/stabilizing effects. The PEG also acts as a buffer in the reaction maintaining a usable pH.

In another embodiment, the effectiveness of the ink is further improved by further loading or functionalisation with an organic viral active/anti-microbial component, such as curcumin, such that in one embodiment an ink comprises a curcumin and silver-nanoparticle graphene oxide ink. This can be manufactured or synthesised by manufacturing a silver-nanoparticle graphene oxide composition as set out above, followed by further functionalisation using curcumin prior to forming the ink. In this embodiment, curcumin ((E,E)-1,7-bis(4-Hydroxy-3-methoxyphenyl)-1,6-heptadiene-3,5-dione) can be dissolved in DI water and combined with the silver-nanoparticle graphene oxide ink to provide curcumin and silver-nanoparticle graphene oxide ink. In turn, this can then be formulated as an ink, as set out above.

General Precursor Formation

As is apparent from above, numerous combinations of reagents can be used to generate the precursor material (i.e. the viral active and/or anti-microbial graphene/graphene oxide materials or mixtures). Table 1 (below) sets out various combinations according to some embodiments:

TABLE 1

| Graphene Source | | Silver Source | | | |
|---|---|---|---|---|---|
| Graphene | Graphene Oxide | Silver NPs | Silver Salts | Reducing Agent | Binder |
| Oxygen functionalised Graphene Nanoplatelets Oxygen level ranging 10-25% | Range of Oxygen levels from 24 to 40% | PVP[2] Capped, size range 6-40 nm | Silver Nitrate | Sodium Citrate | Sodium Hydrosulfide |
| Graphene nano-platelets | | Citrate capped, size range 6-40 nm | Silver acetate | Trisodium Citrate | PEI |
| | | | | Citric Acid | |
| | | | | Sodium Borohydride | |
| | | | | PEG | |

Formation of Inks and Articles

Examples of forming inks and/or articles according to the invention are set out below.

Silver nanoparticle functionalised graphene oxide particles are negatively charged. The electrostatic nature of these particles can adhere them to a positively charged substrate. Therefore, these particles can be added to DI water and used to coat substrates. Examples of such substrate include cotton (e.g. sateen). Others include, nylon 6,6, wool, glass filaments or spun glass.

In another embodiment, the ink may further comprise cationic colloidal particles, such as cationic polyurethane. Such an ink is advantageous in that can be an aqueous solution and rely on electrostatics to coat articles, without being limited to positively charged surfaces. For example, such an ink can be used to coat negatively charged surfaces such as polyesters and polypropylenes. In an embodiment, the colloidal particles are provided and sized so that one colloidal particle retains one flake or particle of silver functionalised graphene oxide to a fibre. This acts as a positive PU particle sandwiched between two negative surfaces.

In other embodiments, the inks rely on chemical/mechanical attachment. For example, binders such as cellulose acetate, cellulose acetate butyrate, diethyl phthalate, poly(methyl methacrylate) and poly(ethylene glycol) are used as a soluble additive in the dispersion which, upon drying, precipitate out and adhere the particles to a substrate (e.g. a fabric).

In one embodiment, the carrier may be a volatile solvent such as isopropanol or ethanol. In methods of forming an article, the substrate can be pre-coated with an adhesive and then an ink containing a solvent can be applied. For example, this ink could be sprayed on using e.g. a volatile solvent. This can adhere the particles to the substrate as the solvent disperse and can use capillary action to orientate the viral active and/or anti-microbial graphene/graphene oxide particles.

EXAMPLES

Unless stated otherwise, the below methods used the following reagents: graphene oxide (1 wt % in water, William Blyth), an aqueous silver nanosphere dispersion (Sigma, 10 nm size, PVP functionalized, 0.02 mg/mL), silver nitrate (99%, Alfa), silver acetate (99%, Alfa), sodium citrate (99%, Alfa), trisodium citrate dihydrate (99%, Alfa), citric acid (99%, Alfa), polyethylene glycol (200 Da, Alfa), polyethylene glycol (2000 Da, Alfa), polyethyleneimine (1200 Da, 99%, Alfa), sodium borohydride (97%, Alfa) and cellulose dialysis tubing (33 mm diameter, 100 ft, Sigma).

Example 1

Prepare Graphene Oxide with Thiol Groups (GO-SH)

Graphene Oxide is provided as a 4 g in 1000 ml dispersion. 125 ml of this is reacted is sonicated for 20 minutes to prepare the dispersion. 8.0 g of sodium hydrosulfide (NaHS) is added gradually and maintained at 55° C. while stirring continuously for 20 hours. The product is filtered and washed with DI water. (Filter using centrifuge at 4000 rpm and wash 5 times with DI water).

The product is direct in a vacuum oven at 50° C. for 3 hours.

Prepare Silver Nitrate Solution To produce 100 ml of a 0.1M solution, while stirring 1.6987 g of $AgNO_3$ is added to 100 ml of distilled water. This is stirred for an hour before use. Alternative Silver Nitrate Solutions include a 0.2M solution (100 ml of a 0.2M solution is prepared by adding (while stirring) 3.3974 g of $AgNO_3$ to 100 ml of distilled water. This is stirred for an hour before use) and a 0.25M solution (4.2468 g of $AgNO_3$ is added to 100 ml of distilled water. This is stirred for an hour before use).

Preparation of Silver Loaded GO Particles (GO-Ag)

0.1 g of the dried GO-SH particles prepared above are added to 30 ml of DI water. This is sonicated for 30 minutes. While stirring the solution, 2 ml of the respective silver nitrate solution (0.1M, 0.2M or 0.25M) as produced above is added. While stirring, 20 ml of 0.1M solution of sodium Hydroxide (NaOH) is added. This is stirred for 20 hours. The dispersion is then centrifuged at 10,000 rpm multiple times to separate the GO-Ag particles. The precipitated GO-Ag particles can then be dried at 60° C. for 24 hours and filtered using dialysis tubing to remove the unreacted salt and loosely bound Ag nanoparticles. For storage, the particles can be added to DI water to limit the oxidation at a concentration of 4 g/litre.

Examples 2 to 8

A number of examples are set out below. The general methodology is set out, with the specifics of each method included in Table 2, below. These Examples use a "co-reduction" method.

Graphene Oxide Dispersion

Graphene oxide (1 wt % in water, William Blyth) was diluted 1/10 by mass to a concentration of 0.1 wt %. The graphene oxide dispersion was mixed to form a uniform dispersion and probe sonicated (40%, 300 W, 10 min process time, 5 s pulses and 5 rests, 18 mm horn, Q Sonics vibra cell 750 W) in an ice bath to disperse and exfoliate. During this process, the dispersion changes from opaque brown to transparent brown.

Co-Reduction With Silver Salt (Production of Ag/Reduced GO)

A generalized description of the synthetic process is provided, refer to Table 2 for specific reaction conditions. The sonicated graphene oxide (1 mg/mL, deionized water) was added to a round bottom flask and stirred with a magnetic stirrer. Optionally the pH was adjusted with either sodium hydroxide solution (0.1M) or ammonium hydroxide (1M). The mixture was then optionally heated in an oil bath to between 60-90° C. under reflux. Either the silver salt or reducing agent was then added but not both. The specific aspects of this for each Example are set out in Table 2.

Once mixed and at the desired temperature the reducing agent/silver salt was added to the reaction in a minimum volume of water (circa 2 mL). The reaction allowed to proceed for up to 2 hours under agitation. Reducing agents were used in a 1 to 10 mole equivalent of the silver nitrate. In some cases a second charge of reducing agent was added and the reaction allowed to proceed for a further 2 hours at 65° C.

Once complete the reaction was allowed to stand at overnight room temperature to sediment. The sedimented Ag and reduced GO particles were then recovered by vacuum filtration onto a 0.2 µm nylon membrane filter (Fisher). The material was then washed with copious amount of water and then stored as a damp powder.

TABLE 2

| Example | Methodology |
|---|---|
| 2 | 50 mL of 1 mg/mL GO was added to 44 mg of silver nitrate. To this 23.2 mL of 0.01M trisodium citrate was added and allowed to stir for 30 min. Sodium borohydride (0.01M in 50 mL 0.01M sodium hydroxide) was added dropwise and the reaction allowed to stir vigorously at room temperature. Once complete a second reduction step was done by adding 0.5 g of ascorbic acid and heating to 65° C. for 1 hr |
| 3 | 50 mL of 1 mg/mL GO dispersion was diluted in to 50 mL of water. 1.69 g of PVP and 40 mg of silver citrate were added. 8.5 mg of ascorbic acid dissolved in 50 mL of water and then added dropwise to the reaction. The silver citrate did not fully dissolve. The reaction was blueish after approx. 1 hour. A second reduction step was then complete by the addition of 0.5 g ascorbic acid and heating to 65° C. for 1 hr. |

TABLE 2-continued

| Example | Methodology |
|---|---|
| 4 | 50 mL of a 1 mg/mL GO dispersion was added to 38 mg of silver citrate to this 253 mg of PVA was added. 70.2 mg of ascorbic acid in 50 mL of water was then added dropwise. The silver citrate did not fully dissolve. After 1 hour a second reduction step was then complete by the addition of 0.5 g ascorbic acid and heating to 65° C. for 1 hr. |
| 5 | 50 mL of a 1 mg/mL GO dispersion was added to 42 mg of silver nitrate. This was stirred and the pH adjusted to 10.5 with 0.1M sodium hydroxide solution. To this 100 mg of ascorbic acid and 50 mg trisodium citrate was added and the reaction allowed to stir for 2 hours. The reaction was then charged with another 0.5 g of ascorbic acid and heated to 65° C. for 1 hours to complete the reduction. |
| 6 | 50 mL of a 1 mg/mL GO dispersion was added to 39 mg of silver nitrate. This was stirred and the pH adjusted to 10-11 with 0.1M sodium hydroxide solution. To this 100 mg of ascorbic acid was added and the reaction allowed to stir for 2 hours. The reaction was then charged with another 0.5 g of ascorbic acid and heated to 65° C. for 1 hour to complete the reduction. |
| 7 | 50 mL of a 1 mg/mL GO dispersion was stirred and the pH adjusted to 10-11 with 1M ammonium hydroxide solution. To this 500 mg of ascorbic acid was added and the pH readjusted to pH 10-11. To this 42 mg of silver nitrate in a minimum volume of water was quickly added and the experiment heated to 90° C. for 2 hours. |
| 8 | 50 mL of a 1 mg/mL GO dispersion was added to 40 mg of silver nitrate and heated to 65° C. Once at temperature ascorbic acid (0.5 g) was added quickly and the reaction allowed to proceed for 2 hours. |

Examples 9-11 (Co-Reduction)

The methodology of Example 7 was used to make three solutions at 20, 40 or 60 wt % silver (Examples 9, 10 and 11, respectively). Graphene oxide was dispersed to 1 mg/mL (0.1 wt. %) as outlined in respect of Example 7, above. 100 mL of the 0.1 wt % GO was then added to a round bottom flask then adjusted to pH 10-11 using ammonium hydroxide (1M). Ascorbic acid was then added in a 10-mole excess to silver nitrate. The pH was then readjusted to pH 10-11 using ammonium hydroxide (1M). No precipitation or sign of GO reduction was observed at this point. The reaction was vigorously stirred, and the silver nitrate added quickly in a minimum volume of water. Silver nitrate was added in an amount that will yield a product that is either 20, 40 or 60 wt % silver (Examples 9, 10 and 11, respectively). For example, to create a 20 wt % solution, 25 mg of silver nanoparticles (0.23 mmol) per 100 mg graphene oxide was required, therefore 39 mg of silver nitrate was added (0.23 mmol). The mixture was then immediately placed in an oil bath set to 90° C. and the reaction allowed to proceed for 2 hours. Once complete the material was allowed to cool and settle overnight then recovered by vacuum filtration (0.2 µm nylon membrane).

Example 12 (Direct Addition)

Graphene oxide was added to a silver nanospheres (0.02 mg/mL silver, 25 mL, Sigma, 10 nm size, PVP functionalized) to achieve a 0.75 mg/mL dispersion of GO in the presence of 0.02 mg/mL silver. The graphene oxide was mixed until there was a uniform dispersion and then probe sonicated (40%, 300 W, 10 min process time, 5 s pulses and 5 rests, 18 mm horn, Q Sonics vibra cell 750 W) in an ice bath to disperse and exfoliate. The material changes from an opaque brown dispersion to a transparent brown dispersion to form the Ag/GO product. These dispersions were noticeable darker and appeared more viscous than an equivalent silver free graphene oxide dispersion.

Analysis

Particle Size

Silver nanoparticle size for Examples 2 to 8 were measured using SEM. The solutions created in the examples were diluted 1/10 by volume in water. 10 µL was dried on a silicon wafer and then analysed by SEM (secondary electron and EDX).

Of Examples 2 to 8, Example 7 provided the best combination of silver nanoparticle size and distribution characteristics. The average particle size of the resultant silver nanoparticles was approximately 40 nm, with a tight distribution with 95% of the particles being between 20 and 60 nm. The SEM and EDX plots demonstrated that the silver deposited evenly on the GO sheets with little free silver in the system.

Figure 4:
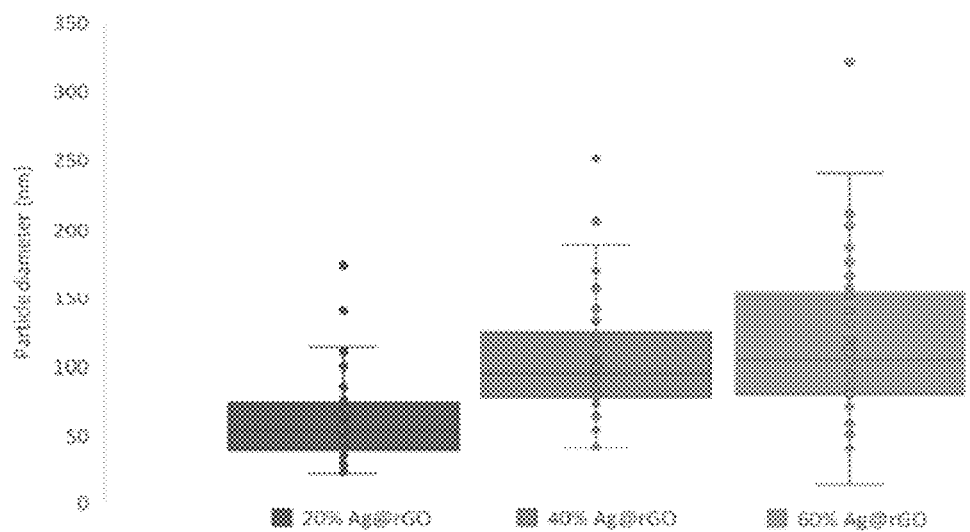
Figure 5:
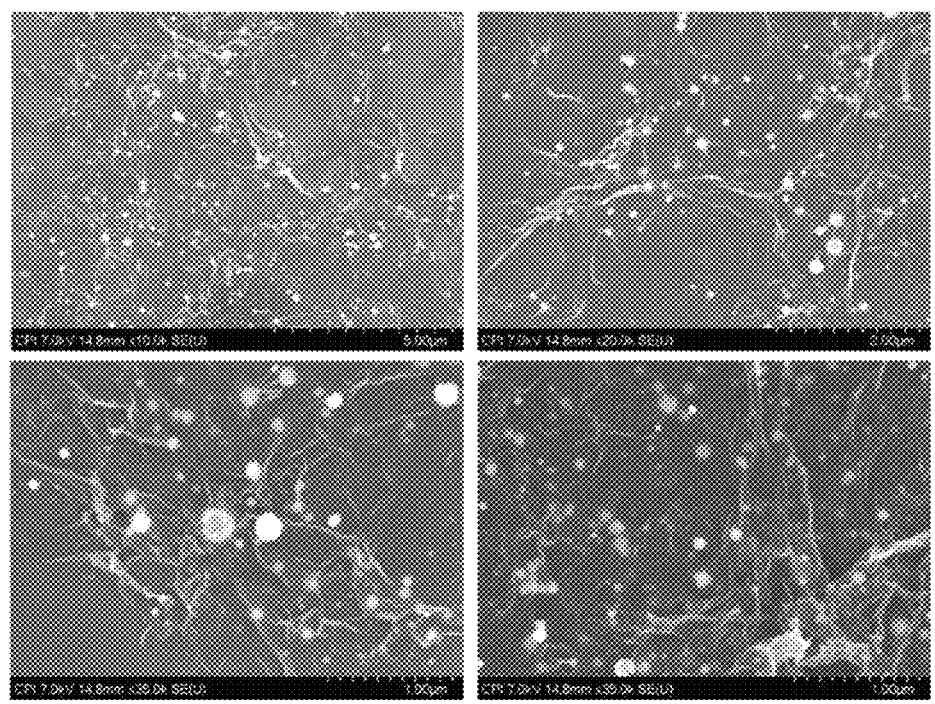
Figure 6A:
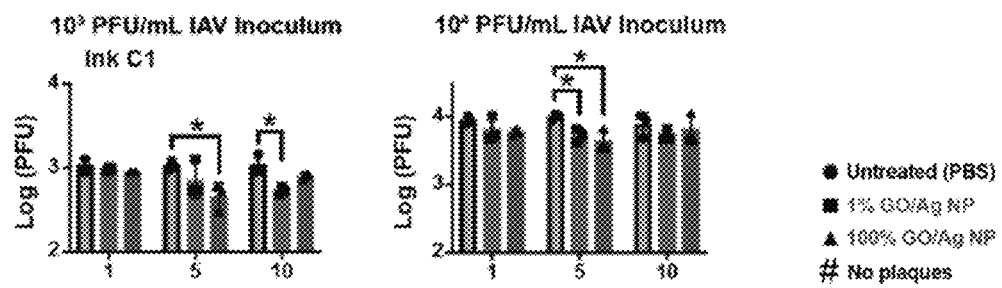
Figure 6B:
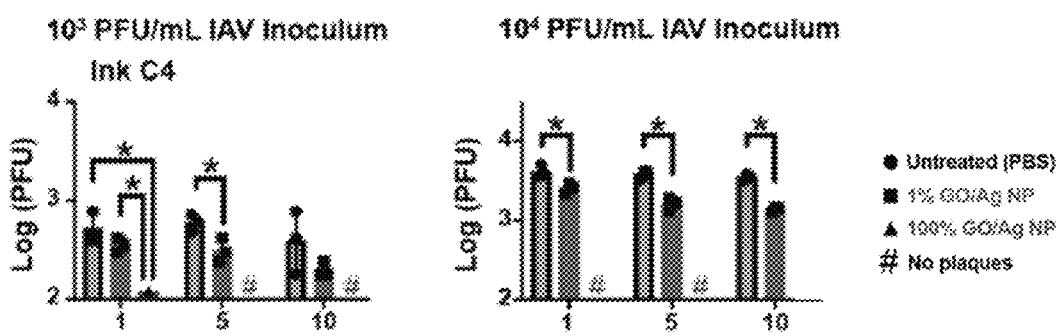
Figure 6C:
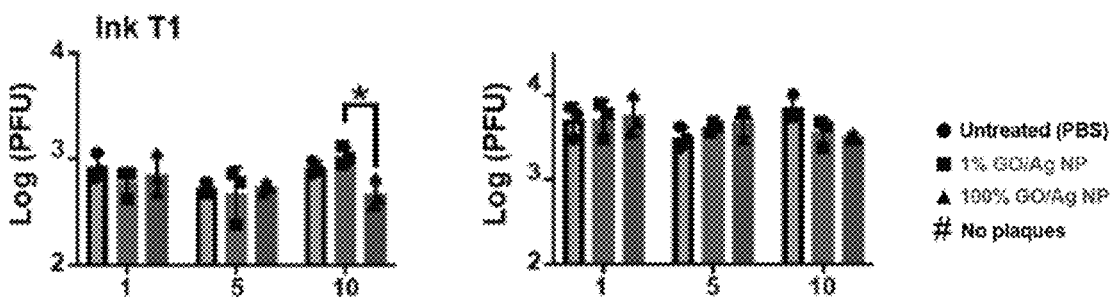
Figure 6D:
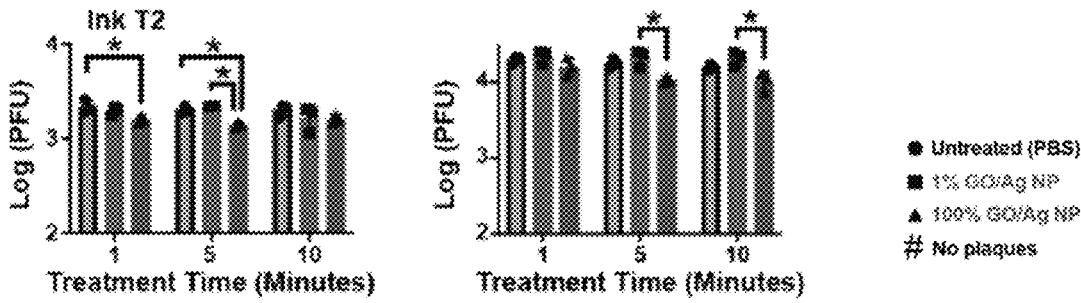

The particle size measurements for Examples 9 to 11 are shown in FIG. 4. The mean sizes of the silver nanoparticles in Examples 9 to 11 were 56, 97 and 106 nm, respectively. These examples showed that increasing the weight level of the nanoparticulate silver increases the mean and modal sizes of the size distribution, but also the width of the spread. FIG. 5 shows SEM images of Example 9.

With Example 12, the particle size of the PVP-capped nanospheres when loaded onto the graphene oxide was spread over a range of 9-18 nm (average particle size of 13 nm). This is largely unchanged relative to the original particle size of the PVP-capped silver nanospheres, which was measured using the same technique (10-15 nm (average particle size of 12 nm) for the silver nanoparticles before combination with GO).

Silver Content

Silver content was measured by Thermogravimetric analysis (TGA) and is shown below in Table 3. Samples of damp powders obtained from Examples 9 to 11 were heated to 120° C. in air to drive off any water and then heated to 900° C. to burn off the graphene leaving only non-combustible materials (silver). The % silver content was calculated by:

$$\% \text{ silver content} = \frac{\% \text{ Mass at 900 C.}}{\% \text{ Mass at 150 C.}} \times 100$$

TABLE 3

| Material | Nominal % Silver Content | Dispersion % Solid Content* | wt % Silver Content |
|---|---|---|---|
| Example 9 | 20 | 3 | 29 |
| Example 10 | 40 | 7 | 50 |
| Example 11 | 60 | 11 | 66 |

Ink Formation

Examples 13 to 16

Dispersions of the silver/graphene oxide nanoparticles of Examples 9 to 12 in deionised water were made at 1 mg/mL by probe sonication (Examples 13 to 16, respectively). For example, solid content of a sample made by the method of Example 12 was determined by TGA (Pyris 1, 10 min at 120° C.). The amount required to achieve a circa 1 mg/mL dispersion in DI water was then weighted out. The graphene—water mixture (10 mL) was then probe sonicated (microtip, 20%, 5 min, 5 s pulse 5 s rest) in an ice bath. The pH of all dispersions were measured to be in the range 6-9.

Examples 17 and 18

Inks were made from Examples 15 (60 wt % based on Example 11) and 16 (PVP-capped Ag NP with GO based on Example 12) (corresponding to Examples 17 and 18, respectively). PVP was added to the 1 mg/mL dispersions prepared in Examples 15 and 16, above, at an amount of 20 wt %. This was then mixed using a Dual Asymmetric Centrifugal (DAC) mixer. This successfully thickened the inks to provide a viscous material which could be roller coated.

Examples 19, 20 and 21

4 mg/mL dispersion of the Ag in reduced graphene oxide material (Example 11) was made using the method used in Example 15, except that probe sonication was carried out at a higher power (40% power, 750 W, 10 min, 5 s pulses) (Example 19). A 0.4 mg/mL dispersion was made using the same method (Example 20). A 0.4 mg/mL dispersion of Ag in GO (Example 12) was prepared using the method of Example 16, followed by a 4/10 dilution (Example 21).

Examples 22 and 23

Example 22 is an ink comprising a thiolised graphene oxide decorated with 10 nm silver nanoparticles at a concentration of 4 g/litre. Example 23 is an ink comprising a thiolised graphene oxide decorated with 40 nm silver nanoparticles at a concentration of 4 g/litre.

Thiolisation of the Graphene Oxide

A 4 g/L dispersion of graphene oxide (prepared in line with the processes set out above) was provided and sonicated for 20 minutes. 375 ml was transferred into a centrifuge flask. 24.0 g of sodium hydrosulphide (NaHS) (Sigma Aldirch code 161527) was gradually added over a period of 30 minutes at room temperature and with agitation (magnetic stirrers). Using a glycol bath, the mixture was heated to 55° C. and maintained at this temperature with continuous stirring for 20 hours. The resultant mixture was centrifuged at 4000 rpm for 45 minutes. Supernatant was decanted. Ultra-high quality (UHQ) water was added, the tube contents mixed to disperse the solid. The mixture was centrifuged at 4000 rpm for 45 minutes. This was repeated several more times to remove unreacted NaHS. In the final wash, as much of the supernatant was removed as possible from the centrifuge tube. The residue was dried in the conical flask in a vacuum oven at 50° C. under full vacuum overnight.

Formation of Silver Decorated GO-SH 0.2046 g of the residue (GO-SH) was dispersed in 114 ml of UHQ water using sonication and a high-speed mixer. This was then separated into 2×57 ml aliquots, each of which was placed in a separate 500 ml centrifuge tube. To one of the 57 ml GO-SH solutions, 250 ml of 10 nm silver nanoparticles (Sigma Aldrich code: 730785-25 ML; 1 mg/L) was added (Example 22). To the second 57 ml GO-SH solution, 250 ml of 40 nm silver nanoparticles (Sigma Aldrich code: 730807-25 ML; 1 mg/L) was added (Example 23). Both solutions were stirring using a magnetic stirrer bar and left overnight.

The dispersions were then separated using a centrifuge at 4000 rpm (10000 rpm was not possible) for several hours and then left to stand over night before decanting. This was carried out several times. The samples were decanted down to 22 ml and 32 ml (10 nm and 40 nm respectively). Both samples were then made up to 50 ml with UHQ water so that the concentration was approximately 4 g/litre.

Coatings

The inks of Examples 15, 16, 17 and 18 were successfully coated onto fabric materials, including Fibertex 100 Pur Trucoat 35 gsm and Fibertex 100-VIS-Flat 50 gsm.

Wash Coating

50×50 mm swatches of the Fibertex 100 Pur Trucoat 35 gsm and Fibertex 100-VIS-Flat 50 gsm materials were placed in a bath of the inks of Examples 15 and 16 until they became saturated and then removed and allowed to air dry on a metal panel at ambient temperature. To the naked eye, both coatings appeared to uniform and even across the fabrics. Both were examined under micrograph. Coatings with the ink of Example 16 were found to provide a uniform tan coating on the fibres of the swatches. It is thought that this is due to the stability of the material in water and the film forming properties of GO. Example 15 provided a coating, but some small agglomerates were seen. It is thought that the reduction of the GO reduced the film forming properties slightly.

Roller Coatings

50×50 mm swatches of the Fibertex 100 Pur Trucoat 35 gsm and Fibertex 100-VIS-Flat 50 gsm materials were laid out on a metal panels and a line of ink (2-3 mL of each of Examples 17 and 18) deposited adjacent to them. The ink of each sample was then coated onto each swatch using an ink roller. The coated swatch was then allowed to air dry on the metal panel. The inks of both Examples appear to deposit quickly and uniformly on both fabrics, and did not fully saturate the fabrics. The fabrics became stiffer on coating but remained pliable.

Antiviral Testing

Anti-viral efficacy was determined by using plaque assay methodology. The strain of virus tested against is Influenza A Virus (IAV). Efficacy of the Ag decorated GO particles in water was determined at two different viral concentrations; Low at $10^3$ Plaque Forming Units (PFU) and a high concentration of $10^4$ PFU. In a standardised test, the supplied dispersion of each Example of Ag decorated GO (250 µl) is mixed with 50 µl of the IAV. The viral efficacy was determined at 1 minute, 5 minutes and 10 minutes after the initial IAV/Ag decorated GO mixing. To separate the IAV and active particles, after the allotted time, the dispersion was centrifuged. Plaque Assays were produced using MDCK cells.

Figure 7:
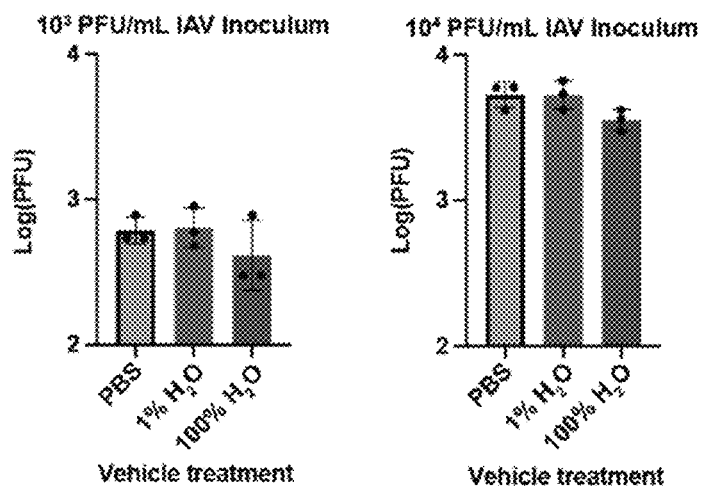
Figure 8:
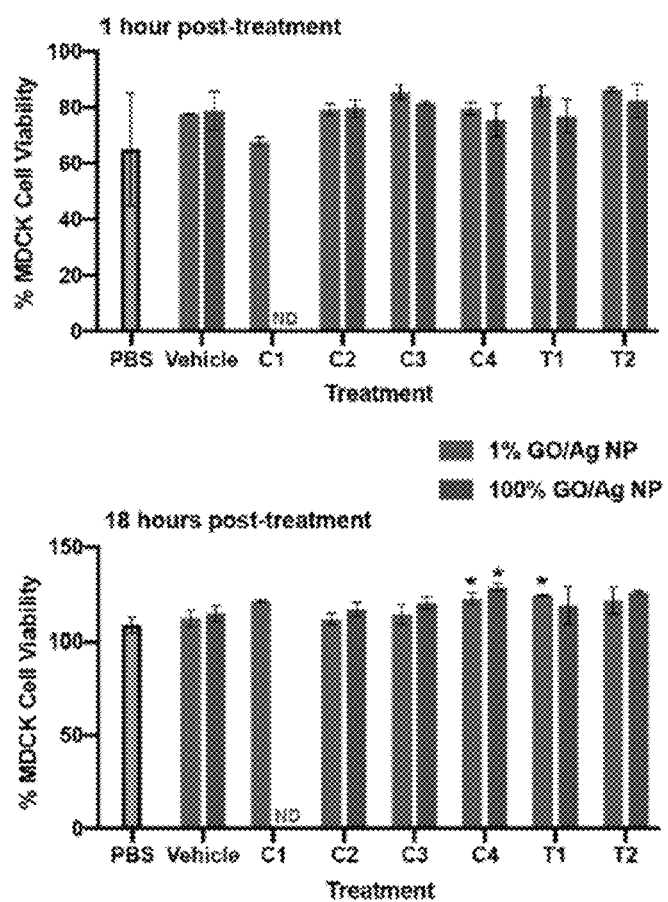

A diluted dispersion was also tested against both low and high PFU. This was diluted at 1:100 in phosphate buffer solution (PBS) (Phosphate-buffered saline 1×, without Ca, Mg, Phenol Red, 0.1 micrometre sterile filtered, pH 7.4, Genesee Scientific). The experimental process and results are discussed below, and shown in FIG. 6-FIG. 8.

GO/Ag NP Treatment

Graphene oxide/silver nanoparticle (GO/Ag NP) ink solutions (see Table 4) were sonicated for 20 minutes to disperse the particles. Ink solutions, vehicle, or 1× PBS (undiluted PBS solution) were added to a 96 well plate in a volume of 250 µL. For treatments, the GO/Ag NP inks were tested undiluted (100% GO/Ag NP; $H_2O$ vehicle) or diluted 100-fold in 1× PBS (1% GO/Ag NP; 1% H2O vehicle).

$10^3$ or $10^4$ PFU/mL of influenza A virus (A/WSN/33 (H1N1), IAV) was added to treatment wells in a volume of 50 µL, for a final volume ratio of GO/Ag NP:IAV of 5:1. 1× PBS (with calcium and magnesium) containing 0.2% bovine serum albumin (BSA) (w/v, Fisher Scientific) vehicle was added to control wells. 1, 5, or 10 minutes after the addition of IAV or vehicle, the plate was centrifuged at 1650×g for 5 minutes. The supernatant was transferred to a clean 96-well plate. Each treatment condition was tested in triplicate.

TABLE 4

| Example | Prepared using method of | Formulation |
|---|---|---|
| Example 9a | Example 9 | 90° C. reduction of silver nitrate at pH 11 with ascorbic acid (20 wt % Ag) |
| Example 12a | Example 12 | Direct addition of PVP-capped Ag NPs to graphene oxide (5 wt % Ag solid) |
| Example 22a | Example 22 | 10 nm Ag NPs on thiolised graphene oxide (4% silver) |
| Example 23a | Example 23 | 40 nm Ag NPs on thiolised graphene oxide (4% silver) |

Quantification of IAV Infectivity

Plaque assays were performed to measure IAV infectivity. MDCK cells were grown to 90-95% confluence in 6 well tissue culture plates in DMEM (ThermoFisher Scientific/Gibco) containing 10% FBS (ThermoFisher Scientific/Gibco) and 1% Penicillin-Streptomycin (ThermoFisher Scientific). The supernatant from the GO/Ag NP treatment plates was serially diluted in 1× PBS/0.2% BSA and 100 µL was seeded onto MDCK cell monolayers. Inoculated plates were incubated for 1 hour at 37° C. Following the incubation, the inoculum was replaced with 1× Dulbecco's Modified Eagle Medium (DMEM) containing 1.2% NaHCO3, 0.2% BSA, and 1% bacteriological agar (Oxoid). After 72 hours of incubation at 37° C., the 1× DMEM/1% bacteriological agar was removed and the MDCK cell monolayers were stained with 0.1% crystal violet. The number of plaques per well was counted to determine viral titers.

Assessment of MDCK Cell Viability

MCDK cell viability following exposure to GO/Ag NP supernatants or vehicle was assessed using a Cytotoxicity Detection Kit (Millipore Sigma #11644793001). Prior to testing, GO/Ag NP ink supernatants or vehicle samples were serially diluted in 1× PBS/0.2% BSA exactly as done in preparation for plaque assays. 100 µL of the undiluted or diluted GO/Ag NP ink supernatants or vehicle (1×PBS) were seeded onto MDCK cells grown to 90-95% confluence in 6-well tissue culture plates. Plates were incubated for 1 hour at 37° C. Supernatants were then replaced with phenol red-free culture media (agar-like culture). Culture media samples were obtained at 1- and 18-hours post-treatment and tested for the presence of lactate dehydrogenase (LDH). The testing comprises mixing an equal volume of cell culture supernatant with diaphorase/NAD+ catalyst containing iodotetrazolium chloride and sodium lactate dye solution in the wells of an optically clear 96 well plate. The mixture is then incubated for 30 minutes at 25° C. Cells grown only in the presence of media were the low LDH control. Cells lysed with 2% Triton-X were the high LDH control. Optical density (OD) was measured at 490 nm with a reference wavelength of 650 nm. The percent viability was calculated as:

$$\left(1 - \left(\frac{\text{Experimental } OD - \text{Low control } OD}{\text{High control} - \text{Low control } OD}\right)\right) \times 100$$

Results

The GO/Ag NP ink solutions (Table 4) were tested for their ability to reduce the level of infectious IAV by mixing with either $10^3$ or $10^4$ PFU/mL IAV at a volume ratio of 5:1 and incubated for 1, 5, or 10 minutes. The results are set out in FIG. 6A-D. Plaque assays were then performed to assess IAV infectivity following GO/Ag NP exposure by to quantifing viral plaque forming units (PFU) after treatment. Undiluted (100%) GO/Ag NP Example 12a completely inhibited IAV plaque formation at all exposure time points examined. 1% GO/Ag NP sample Example 12a was also able to significantly inhibit plaque formation at all exposure time points (FIG. 6B). All other ink solutions were capable of significantly reducing viral load by up to 0.5 log under certain treatment conditions. The aqueous GO/Ag NP vehicles did not impact IAV viability compared to PBS alone (FIG. 7), nor were GO/Ag NP ink supernatants found to impact MDCK cell viability (FIG. 8).

In FIG. 6, the 1% GO/Ag NP ink solutions are shown with a blue bar (middle bar for each timeset), the 100% GO/Ag NP ink solutions are shown with a red bar (right hand bar for each time set) and the 1× PBS is shown with a black bar (left hand bar for each timeset). The same colours or arrangement of bars are used in FIGS. 7, 8 and 10. The x axis shows time (1, 5 or 10 minutes). They axis shows Log(PFU). This is the same for all of the graphs of FIGS. 6A-6D, 7, 8 and 10. Plaque assay results are shown following treatment with FIG. 6A—Example 9a, FIG. 6B—Example 12a, FIG. 6C—Example 22a, and FIG. 6D Example 23a. Data shown are the average±SD, n=3 samples per group. * indicates $p \leq 0.05$. Significance was determined using a two-way ANOVA with Tukey's multiple comparison's test.

FIG. 7 shows the result of an investigation into whether aqueous vehicles alter IAV infectivity (using GO/Ag NPs). $10^3$ or $10^4$ PFU/mL IAV was exposed to 1% H2O (diluted in 1× PBS, blue bar) or 100% H2O (red bar) vehicle or to 1× PBS (black bar) for 10 minutes. Viral PFUs were then measured by plaque assay, as set out above. Data shown are the average±SD, n=3 samples per group. Significance was determined by a Kruskal-Wallis test.

FIG. 8 shows the result of an investigation into whether supernatants affect MDCK cell viability. MDCK cells were exposed to the supernatants of each GO/Ag NP sample from Table 4, vehicle, or 1× PBS. Blue bars represent MDCK cells treated with the supernatant from a 1% solution of GO/Ag NP or 1% $H_2O$ vehicle, while red bars indicate 100% GO/Ag NP or 100% $H_2O$ vehicle. The black bar represents MDCK cells exposed to 1× PBS. The concentration of LDH was measured in media collected 1 hour (top) and 18 hours (bottom) post-treatment. The percent viability was determined as described in the Materials and Methods. Data shown are the average±SD, n=3 samples per group. * indicates $p \leq 0.05$ as compared to the PBS control. Significance was determined using a two-way ANOVA with Tukey's multiple comparison's test. ND=no data available.

Figure 9:
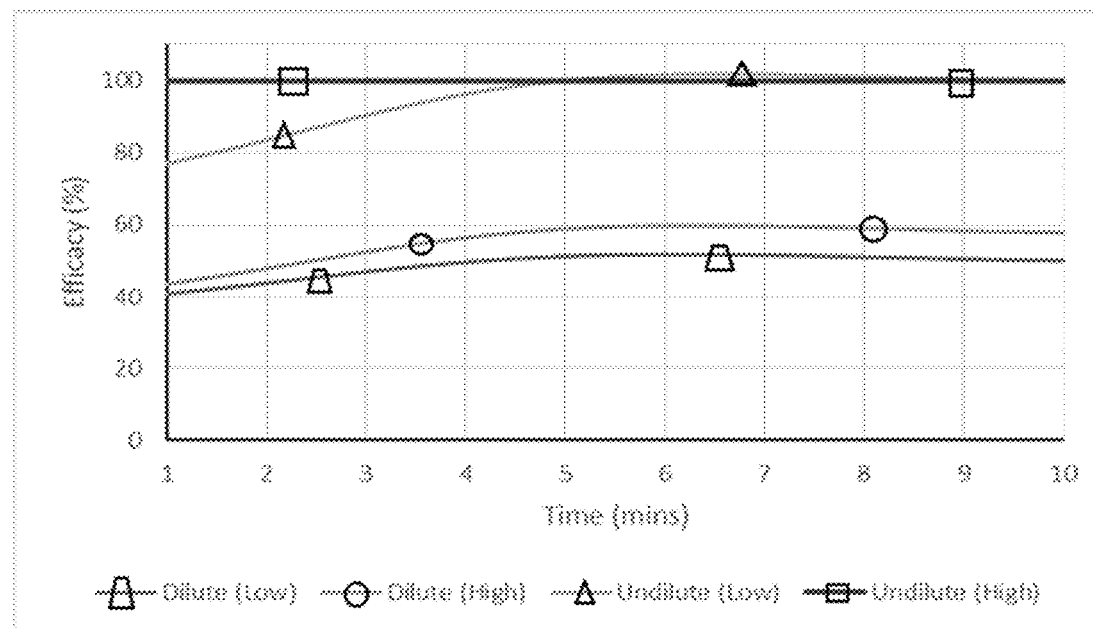
Figure 10:
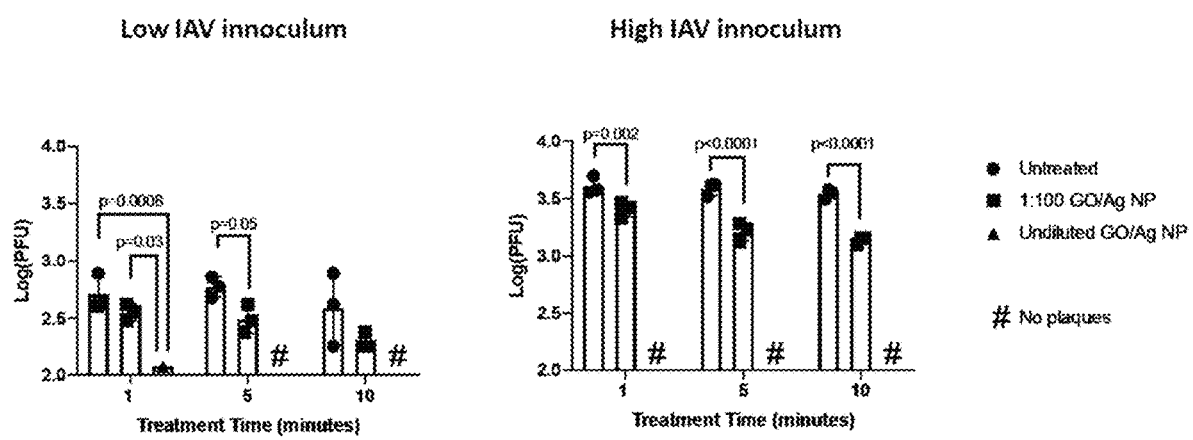

FIG. 9 and FIG. 10 show the results of Example 12a in more detail. Here it is seen that the undiluted version provided 100% efficacy, and even the diluted version has a significant effect on cell viability. Low and high refer to the PFU. It is thought that this is due to the synergistic effect between the oxidation capability (of the virus lipid membrane) of the GO and that of the silver. By using the direct addition method in which the functional groups on the GO are not reduced, this high oxidation capability of the GO and also spacing of the silver nanoparticles across the GO. The addition of the PVP coated silver only uses a few available oxygen sites (O, COOH and OH) leaving a significant number of oxygen species on the edge/surface of the GO.

Although the invention has been described with reference to specific embodiments and examples above, it will be appreciated that modifications can be made to the embodiments and examples without departing from the invention.

The invention claimed is:

1. An ink for providing a viral active and/or anti-microbial coating to a substrate, comprising:

a carrier;

graphene and/or graphene oxide particles dispersed in the carrier; and a viral active and/or anti-microbial component adhered to the graphene and/or graphene oxide particles, wherein the viral active and/or anti-microbial component comprises metal nanoparticles capped with a capping agent; and wherein the graphene and/or graphene oxide particles and viral active and/or anti-microbial component combined have a weight content of 1 wt % to 5 wt % of metal nanoparticles.

2. The ink according to claim 1, wherein the metal nanoparticles have a particle size of from 1 to 100 nm.

3. The ink according to claim 1, wherein the graphene and/or graphene oxide particles have a surface coverage of the viral active and/or anti-microbial component of from 5% to 60%.

4. The ink according to claim 1, wherein the graphene and/or graphene oxide particles and viral active and/or anti-microbial component combined have a weight content of from 1 wt % to 60 wt % viral active and/or anti-microbial component.

5. The ink according to claim 1, wherein the graphene and/or graphene oxide particles are functionalised particles and comprise functional groups selected from thiols, hydroxyl, carboxyl, epoxy and/or carbonyl groups.

6. The ink according to claim 1, wherein the ink further comprises (i) a binder, optionally selected from cellulose acetate, cellulose acetate butyrate, diethyl phthalate, poly(methyl methacrylate), poly(ethylene) glycol and polyvinylpyrrolidone (PVP); (ii) a drying agent; and/or (iii) a rheology modifier.

7. The ink according to claim 1, wherein the concentration of the combined graphene and/or graphene oxide particles and viral active and/or anti-microbial component in the carrier is from 0.05 mg/ml to 10 mg/ml.

8. The ink according to claim 1, wherein the viral active and/or anti-microbial component comprises silver nanoparticles.

9. The ink according to claim 8, wherein the silver nanoparticles are capped with a polymeric capping agent selected from polyethylene glycol (PEG), ethylenediaminetetraacetic acid (EDTA), polyvinyl pyrrolidone (PVP) and polyvinyl alcohol (PVA).

10. The ink according to claim 1, wherein the metal nanoparticles have a number average particle size of from 1 nm to 40 nm.

11. The ink according to claim 10, wherein the metal nanoparticles have a number average particle size of from 1 nm to 20 nm.

12. A method of producing an ink, comprising:

(a) combining graphene and/or graphene oxide particles with a viral active and/or anti-microbial component to adhere the viral active and/or anti-microbial component to the graphene and/or graphene oxide particles; and (b) dispersing the combined graphene and/or graphene oxide particles and viral active and/or anti-microbial component in a carrier, wherein the viral active and/or anti-microbial component comprises metal nanoparticles capped with a capping agent; and wherein the graphene and/or graphene oxide particles and viral active and/or anti-microbial component combined have a weight content of 1 wt % to 5 wt % of metal nanoparticles viral active and/or anti-microbial component.

13. The method according to claim 12, wherein combining graphene and/or graphene oxide particles with a viral active and/or anti-microbial component comprises dispersing the graphene and/or graphene oxide particles and the viral active and/or anti-microbial component in a carrier, followed by adhering the viral active and/or anti-microbial component to the graphene and/or graphene oxide particles.

14. The method according to claim 13, wherein dispersing the graphene and/or graphene oxide particles and the viral active and/or anti-microbial component in a carrier comprises dispersing graphene and/or graphene oxide particles in a carrier, followed by addition of the viral active and/or anti-microbial component to the carrier.

15. The method according to claim 13, wherein a viral active and/or anti-microbial precursor is added to the carrier and the method comprises converting the precursor into the viral active and/or anti-microbial component in situ.

16. The method according to claim 15, wherein the graphene is a functionalised graphene, and the step (a) comprises combining functionalised graphene and/or graphene oxide with a viral active and/or anti-microbial precursor, followed by addition of a reducing agent to reduce the viral active and/or anti-microbial precursor to form the viral active and/or anti-microbial component.

17. The method according to claim 12, wherein the viral active and/or anti-microbial component is a metal nanoparticle, and the metal nanoparticle is combined with graphene and/or graphene oxide particles in the carrier.

18. The method according to claim 12, further comprising the step of functionalising the graphene and/or graphene oxide particles prior to step (a), optionally wherein the step of functionalising the graphene and/or graphene oxide particles comprises functionalising the graphene and/or graphene oxide particles with at least one functional group selected from thiol, hydroxyl, carboxyl, epoxy and/or carbonyl groups.

* * * * *